United States Patent
Wang et al.

(10) Patent No.: US 11,625,537 B2
(45) Date of Patent: Apr. 11, 2023

(54) ANALYSIS OF THEME COVERAGE OF DOCUMENTS

(71) Applicant: FUJITSU LIMITED, Kawasaki (JP)

(72) Inventors: Jun Wang, San Jose, CA (US); Kanji Uchino, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 318 days.

(21) Appl. No.: 16/799,657

(22) Filed: Feb. 24, 2020

(65) Prior Publication Data
US 2021/0264115 A1   Aug. 26, 2021

(51) Int. Cl.
*G06F 40/30*   (2020.01)
*G06F 40/289*   (2020.01)
*G06F 16/26*   (2019.01)
*G06N 7/00*   (2023.01)
*G06N 20/00*   (2019.01)

(52) U.S. Cl.
CPC .............. *G06F 40/30* (2020.01); *G06F 16/26* (2019.01); *G06F 40/289* (2020.01); *G06N 7/005* (2013.01); *G06N 20/00* (2019.01)

(58) Field of Classification Search
None
See application file for complete search history.

(56) References Cited

U.S. PATENT DOCUMENTS

2017/0185601 A1*  6/2017  Qin .......................... G06Q 50/01
2017/0228654 A1*  8/2017  Skupin ..................... G06F 16/29

OTHER PUBLICATIONS

Hannah Kim, Jaegul Choo, Jingu Kim, Chandan K. Reddy, and Haesun Park. 2015. Simultaneous Discovery of Common and Discriminative Topics via Joint Nonnegative Matrix Factorization. In Proceedings of the 21th ACM SIGKDD International Conference on Knowledge Discovery and Data Mining(KDD '15). ACM, New York, NY, USA, 567-576. DOI: https://doi.org/10.1145/2783258.2783338.

Xiang Ren, Yuanhua Lv, Kuansan Wang, and Jiawei Han. 2017. Comparative Document Analysis for Large Text Corpora. In Proceedings of the Tenth ACM International Conference on Web Search and Data Mining (WSDM '17). ACM, New York, NY, USA, 325-334. DOI: https://doi.org/10.1145/3018661.3018690.

\* cited by examiner

*Primary Examiner* — Quynh H Nguyen
(74) *Attorney, Agent, or Firm* — Maschoff Brennan

(57) ABSTRACT

According to an aspect of an embodiment, operations may include obtaining multiple electronic documents and obtaining a theme text. The method may also include selecting a seed text based on a semantic similarity between the seed text and the theme text. The method may also include changing a seed weight included in a weight vector that is used in identification of topics of the multiple electronic documents. The changed seed weight may bias the identification of topics of the plurality of electronic documents in favor of the seed text as compared to one or more other text strings of the weight vector. The method may also include generating, a representation of a topic model for display to a user, the topic model may be based on the multiple electronic documents and the weight vector.

20 Claims, 12 Drawing Sheets

| Top-Ranking Topic Term 702 | Phrase Representation 704 | Summary 706 |
|---|---|---|
| NLP | Natural_Language<br>Machine_Translation<br>Word_Embedding<br>Language_Model<br>Speech_Recognition<br>Question_Answering<br>Attention_Mechanism<br>Natural_Language Processing<br>Neural_Machine_Translation<br>Acoustic_Model<br>Visual_Question_Answering | A Proposed Statistical Machine Translation (SMT) Based Model That Can Be Used To Translate A Sentence From The Source Language (English) To The Target Language (Arabic) Automatically Through Efficiently Incorporating Different Statistical And Natural Language Processing (NLP) Models Such As Language Model, Alignment Model, Phrase Based Model, Reordering Model, And Translation Model<br><br>Learning Word Embeddings From Intrinsic And Extrinsic Views While Word Embeddings Are Currently Predominant For Natural Language Processing, Most Of Existing Models Learn Them Solely From Their Contexts<br><br>Neural Attention Models For Sequence Classification: Analysis And Application To Key Term Extraction And Dialogue Act Detection Recurrent Neural Network Architectures Combining With Attention Mechanism, Or Neural Attention Model, Have Shown Promising Performance Recently For The Tasks Including Speech Recognition, Image Caption Generation, Visual Question Answering And Machine Translation |

*FIG. 7*

| Topics 802 | Document 804A | Document 804B | Document 804C | Document 804D | Document 804E |
|---|---|---|---|---|---|
| Human-Centric 802A | ★ | ★ | | ★★ | ★★★ |
| Privacy 802B | ★★★ | | ★ | | ★★★ |
| Fairness 802C | ★★★ | ★★ | ★ | ★★★ | ★★★ |
| Trustworthy 802D | ★ | | | ★ | ★★★ |
| Transparency 802E | ★★ | ★ | | ★ | ★★★ |
| Explainable 802F | ★★★ | ★ | | | ★★★ |

FIG. 8A

ANALYSIS OF THEME COVERAGE OF DOCUMENTS

FIELD

The embodiments discussed in the present disclosure are related to analysis of theme coverage of documents.

BACKGROUND

Entities may generate, receive, and store large numbers of electronic documents. These electronic documents may be retrieved (e.g., via a search engine search) for viewing by users. Many times, the electronic documents are not classified based on the subject matter that the electronic documents include or are classified based on different subject matter than that which may be of interest to a particular user. This may complicate the identification of documents that may be of interest to the particular user.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include obtaining multiple electronic documents and obtaining a theme text indicative of a theme of interest to a user. The method may also include determining a semantic similarity between the theme text and each of a plurality of text strings included in a dictionary. The method may also include selecting a seed text from the plurality of text strings in response to a particular semantic similarity between the seed text and the theme text satisfying a semantic similarity threshold. The method may also include changing a seed weight included in a weight vector that is used in identification of topics of the plurality of electronic documents. The weight vector may include a plurality of weights that each correspond to a different one of the plurality of text strings in which the seed weight corresponds to the seed text. The changing of the seed weight may be in response to selection of the seed text and may bias the identification of topics of the plurality of electronic documents in favor of the seed text as compared to one or more other text strings of the plurality of text strings. The method may also include generating a representation of a topic model for display to a user, the topic model may be based on the plurality of electronic documents and the weight vector. The topic model may identify one or more topics of the plurality of electronic documents.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIG. 7 illustrates an example topic representation of a topic of electronic documents, FIGS. 8A-C illustrate example theme-coverage representations of themes of electronic documents.

Figure 1:
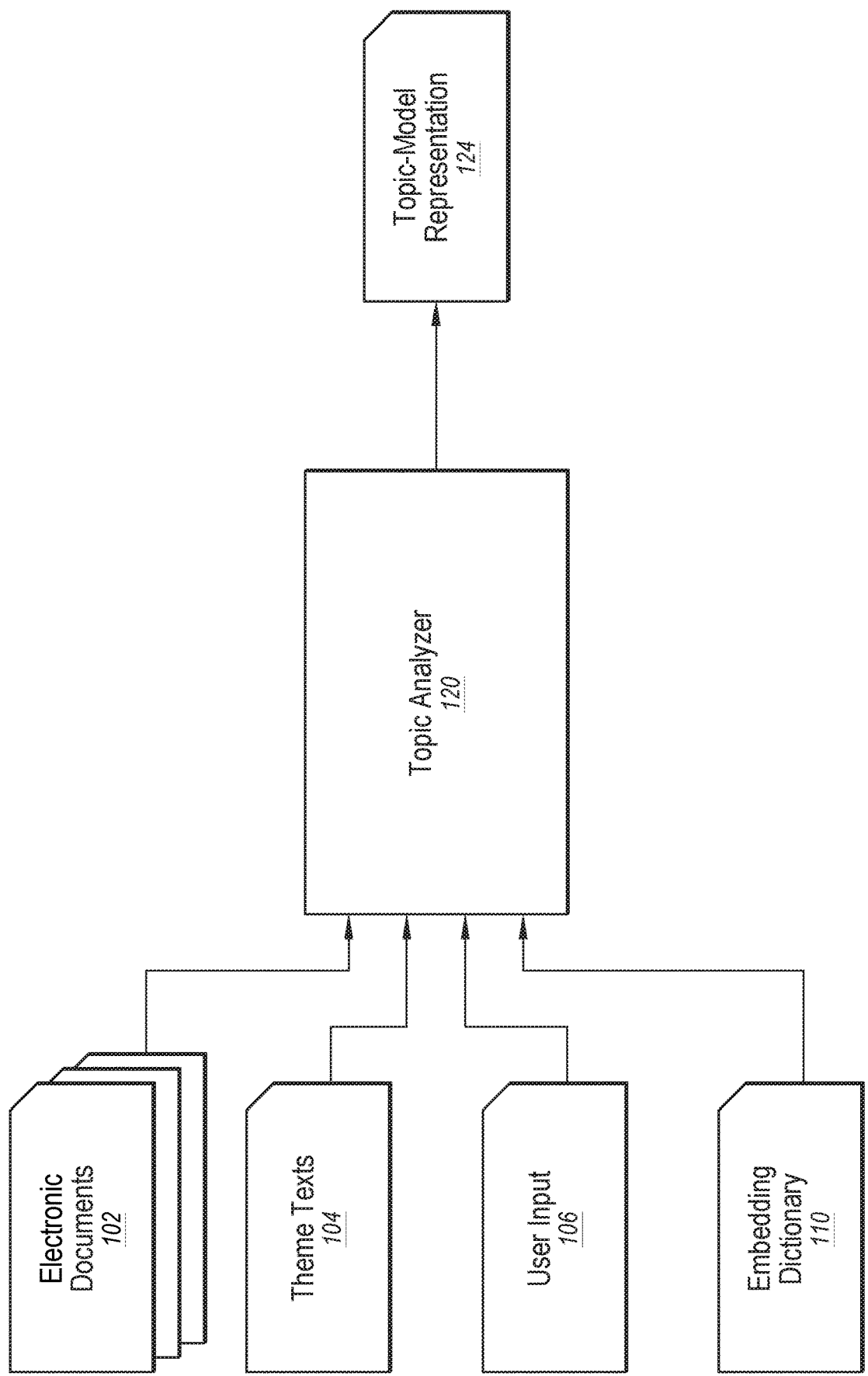
FIG. 1 is a diagram representing an example environment related to topic analysis using semantic similarity.

all arranged according to at least one embodiment described in the present disclosure.

DESCRIPTION OF EMBODIMENTS

Some embodiments described in the present disclosure relate to methods and systems for topic analysis using semantic similarity.

There are millions of electronic documents stored on computing systems throughout the world. A user may access the electronic documents (e.g., through the Internet), for example, to research subject matter of interest of the user.

For example, a user may wish to do scholarly research about artificial intelligence. The user may use a search engine to retrieve electronic documents from the internet including the words "artificial intelligence." The search engine may retrieve millions of documents. Some of the documents may be more relevant to the scholarly research of the user than others. Information regarding topics of the documents may improve at least the efficiency of the scholarly research of the user. For example, the user may be interested in electronic documents related to the ethics of artificial intelligence and not interested in electronic documents related to science fiction or the details of machine-learning techniques. Information indicating topics of the electronic documents may aid the user in identifying electronic documents that may pertain to the ethics of artificial intelligence.

Some embodiments of the present disclosure relate to analyzing topics of electronic documents using semantic similarity. These or other embodiments may assist a user in gathering information by classifying electronic documents according to topics found in the electronic documents. Additionally or alternatively, embodiments of the present disclosure may assist the user in understanding the electronic documents, collectively and/or individually, based on the topics found in the electronic documents collectively and/or individually. Additionally or alternatively, in the absence of a particular user, embodiments of the present disclosure may identify topics of electronic documents that may be used to classify, organize, and/or label the electronic documents which may be useful for users generally.

For example, multiple electronic documents may be obtained (e.g., a million electronic documents may be obtained from an Internet search). One or more theme texts indicative of one or more themes of interest to a user may be obtained. In the present disclosure, the term "text" may include one or more words, for example, a word, a phrase, sentence, a bi-gram, tri-gram, or n-gram, etc. Based on embedding vectors (e.g., word embeddings, phrase embeddings and/or sentence embeddings) of an embedding dictionary, seed texts that are semantically similar to the theme texts may be identified.

A weight vector including multiple weights corresponding to multiple texts may be obtained. The weight vector may be useful for identification of topics of electronic documents. For example, the weight vector may be used as a prior knowledge vector in a Bayesian inference technique in generating a topic model through topic inference.

Weights of the weight vector corresponding to the seed texts may be changed such that when the weight vector is used by the topic inference technique, the identification of topics (e.g., for a topic model) is biased in favor of the seed texts as compared to other texts. The weight vector may be used by the topic inference to generate a topic model. The resulting topic model may include topics biased in favor of the seed texts as compared to other texts.

For example, a user may indicate an interest in the theme "fairness." The texts "impartiality" and "integrity" may be identified as being semantically similar to "fairness" (e.g., through a comparison of corresponding word embeddings from an embedding dictionary). A weight vector including multiple words (e.g., ten thousand words, word stems, and/or n-grams) may be updated such that the weights corresponding to the texts "fairness," "impartiality," and "integrity" are increased. The weight vector, including the updated weights, may be used as a prior knowledge vector in a Bayesian inference technique that is applied to a corpus of documents to generate a topic model with respect to the documents of the corpus of documents. Based on the updated weights, the topic inference technique may identify a first topic related to the texts "fairness," "impartiality," and/or "integrity." For example, the texts "fairness," "impartiality," and/or "integrity" may be included as topic terms of the first topic. Additionally or alternatively, stems and/or n-grams of the texts the texts "fairness," "impartiality," and/or "integrity" may be included as topic terms of the first topic.

Additionally or alternatively, the user may also indicate an interest in the theme "transparency." The texts "open" and "honest" may be identified as being semantically similar to "transparency." A separate weight vector including updated weights corresponding to the texts "transparency," "open," and "honest" may be generated. The separate weight vector may be used by the topic inference technique. Because of the updated weights, the topic inference technique may identify a second topic related to the texts "transparency," "open," and "honest." For example, the texts "transparency," "open," and "honest" may be included as topic terms of the second topic.

In this manner, a user may identify themes of interest to the user and a topic model may be generated that may be biased to include topics that may correspond to the themes identified by the user.

In some embodiments, after the topic model has been generated, the topics and/or topic terms that characterize the topics may be refined. For example, additional topic terms may be identified based on a semantic similarity between seed texts and/or the theme text and the additional topic terms. Additionally or alternatively, inconsistent topic terms may be removed based on a semantic dissimilarity between the seed texts and/or theme text and the inconsistent topic terms. Additionally or alternatively, topic terms may be reordered based on semantic similarity between the various topic terms and the seed texts and/or the theme texts.

In some embodiments, a refined weight vector may be generated based on the refined topics and/or refined topic terms. The refined weight vector may be newly generated or the weight vector generated earlier may be updated. The refined weight vector may include weights such that when the refined weight vector is used by the topic inference technique, the identification of topics is biased in favor of the refined topic terms and/or the refined topics as compared to other texts. In some embodiments, the refined weight vector may be used by the topic inference technique to generate a refined topic model.

Additionally or alternatively, embodiments of the present disclosure may calculate theme coverage of a topic model (e.g., the topic model generated using the weight vector, or another topic model), which may include an indication of how themes identified by the user are related to electronic documents. For example, the theme coverage may include numbers and/or proportions of the electronic documents that relate to the themes.

Additionally or alternatively, embodiments of the present disclosure may generate a representation of a topic model (e.g., the topic model generated using the weight vector, or another topic model), and/or the theme coverage. For example, topics of the topic model, and/or the theme coverage may be represented in a visual representation that may be displayed to the user.

Embodiments of the present disclosure are explained with reference to the accompanying drawings.

FIG. 1 is a diagram representing an example environment 100 related to topic analysis using semantic similarity, arranged in accordance with at least one embodiment described in the present disclosure. The environment 100 may include a topic analyzer 120 which may generate a topic model that may describe topics of electronic documents 102. The topic model may be included in the topic analyzer 120. For example, the topic model may be an algorithm or data structure used by the topic analyzer. The topic analyzer 120 may take the electronic documents 102, theme texts 104, a user input 106, and an embedding dictionary 110 as inputs and generate the topic model and/or a topic-model representation 124 as outputs.

In some embodiments, the electronic documents 102 may include multiple electronic documents according to any suitable format. For example, the electronic documents 102 may include tens, hundreds, thousands, millions, or even more electronic documents in a format such as hypertext markup language (html), postscript document format (pdf), text format (txt), or Word document format (doc). In some embodiments, the electronic documents 102 may be obtained from a search on a computer network, e.g., the Internet. Additionally or alternatively, the electronic documents 102 may have been selected or retrieved by a search engine in response to a search query. For example, the electronic documents 102 may have been obtained in response to a search on the Internet using a search text indicative of a broad theme of interest to a user.

In some embodiments, the theme texts 104 may include one or more words, phrases, sentences, bi-grams, tri-grams, and/or n-grams, indicative of a theme of interest to a user. In some embodiments, the user may provide the theme texts 104 to the topic analyzer 120. In some embodiments, the theme texts 104 may be a sub-theme, or a theme within the broad theme of the electronic documents 102. For example, if the electronic documents 102 were obtained in response to a search for "artificial intelligence ethics," the theme texts 104 may include "fairness," "equitability," "integrity," and "transparency."

In some embodiments, the user input 106 may include one or more indications from the user related to the electronic documents 102, and/or topics of the electronic documents 102. For example, in some embodiments, the user may view the topic-model representation 124 and provide feedback (e.g., user input 106) relative to one or more of the topics of the topic model. The topic analyzer 120 may be configured to refine the topic model and/or the topic-model representation 124 based on the user input 106.

In some embodiments, the embedding dictionary 110 may include multiple word embeddings, phrase embeddings, and/or sentence embeddings. The embeddings may include multi-dimensional vectors of numbers (e.g., fifty-dimensional vectors or one-hundred-dimensional vectors). The embeddings may be used to determine semantic similarities. For example, two words that are semantically similar may have a relatively small vector distance (e.g., cosine distance) between their word embeddings. For example, the word "king" and the word "queen" may be used in similar contexts, therefore the word embedding vectors of the word "king" and "queen" may be closer than the word embedding vectors of the word "king" and the tri-gram "natural language processing." The embedding dictionary 110 may have been generated using artificial neural networking techniques, such as, Embeddings from Language Models (ELMo) or Bidirectional Encoder Representations from Transformers (BERT). Thus, the word embeddings may be referred to as "neural word embeddings."

The topic analyzer 120 may include code and routines configured to enable a computing device to perform one or more operations with respect to analyzing topics of the electronic documents 102 to obtain the topic model and/or the topic-model representation 124. Additionally or alternatively, the topic analyzer 120 may be implemented using hardware including a processor, a microprocessor (e.g., to perform or control performance of one or more operations), a field-programmable gate array (FPGA), or an application-specific integrated circuit (ASIC). In some other instances, the topic analyzer 120 may be implemented using a combination of hardware and software. In the present disclosure, operations described as being performed by the topic analyzer 120 may include operations that the topic analyzer 120 may direct a corresponding system to perform.

In some embodiments, the topic analyzer 120 may be configured to generate the topic model and/or the topic-model representation 124 both of which may include topics of the electronic documents 102. The topic analyzer 120 may be configured to bias the topics of the topic model based on theme texts 104 and/or the user input 106. Additionally or alternatively, the topic analyzer 120 may bias the topics of the topic model based on texts that are semantically similar to the theme texts 104 as determined using the embedding dictionary 110.

Figure 4:
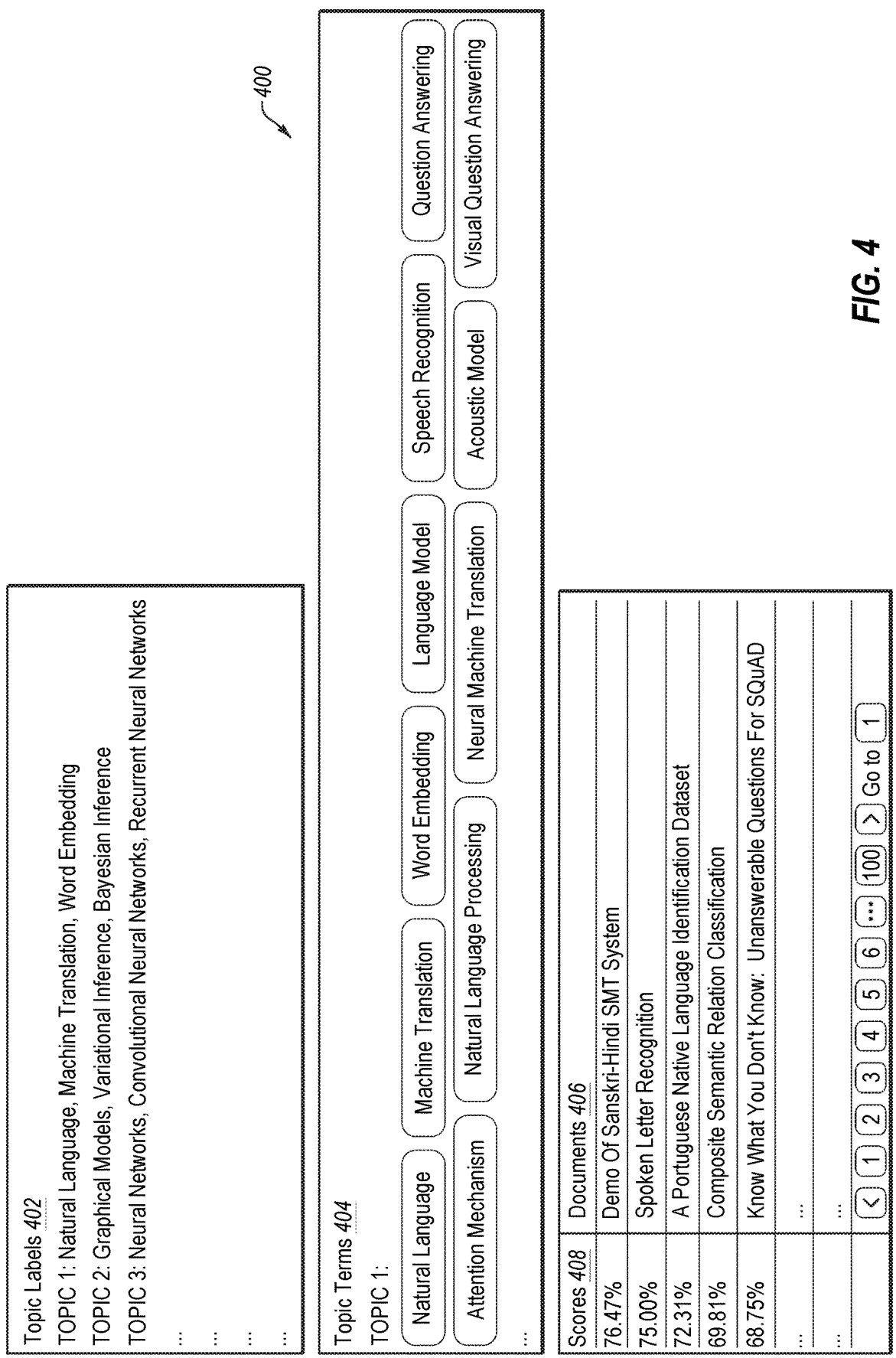
FIG. 4 illustrates an example representation of a topic model.

In some embodiments, the topic model may include an algorithm and/or data structure representing associations between texts and the electronic documents 102. Additionally or alternatively, the topic model may include multiple topics into which the electronic documents 102 may be categorized. Additionally or alternatively, the topic model may include associations between the multiple topics and the electronic documents 102. In some embodiments, the topics may each include topic terms and/or topic labels that may be characteristic of the topics. For example, the topic terms may include texts that may be common among electronic documents associated with the topic. An example of a representation of a topic model is illustrated in FIG. 4.

Figure 8B:
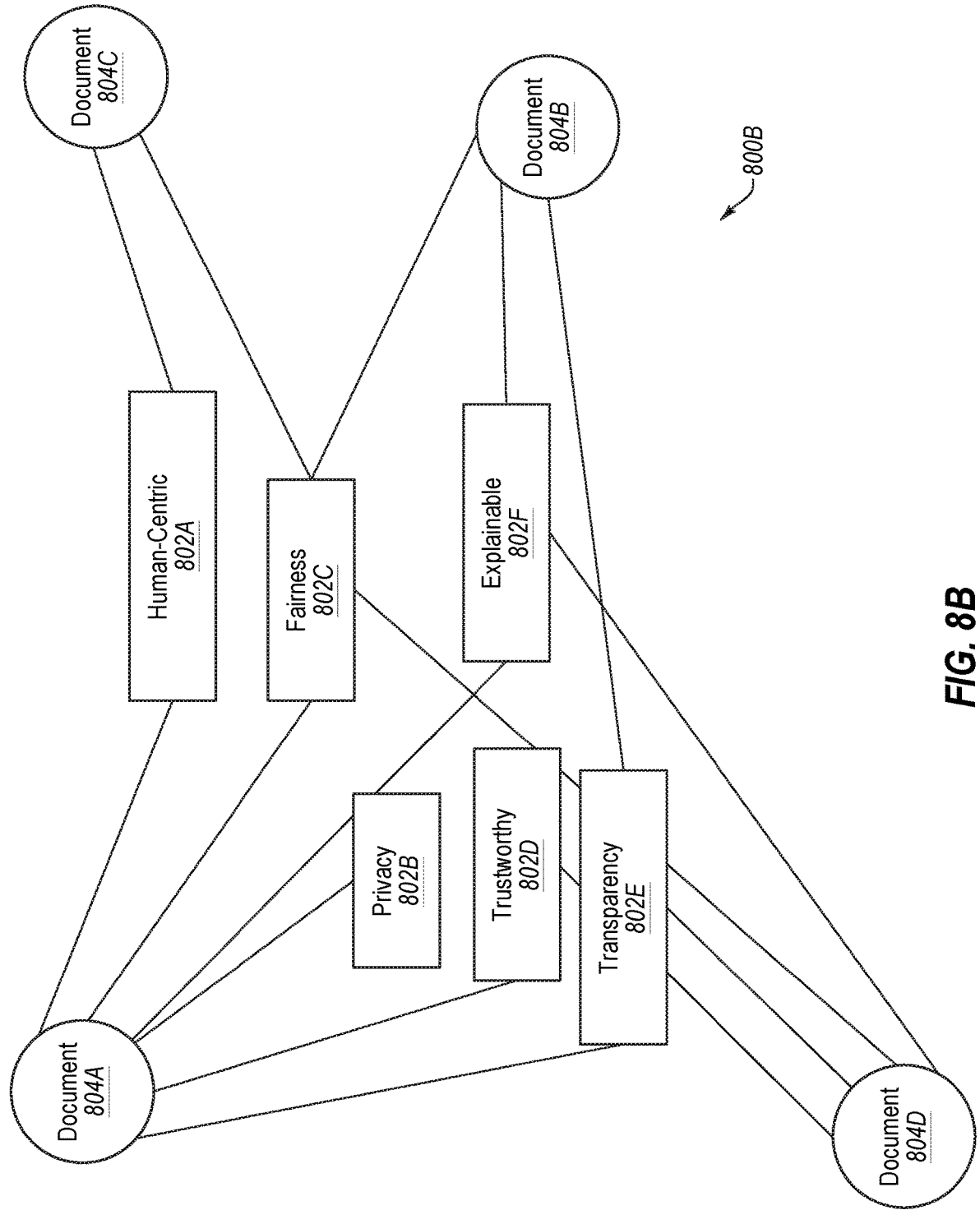
Figure 8C:
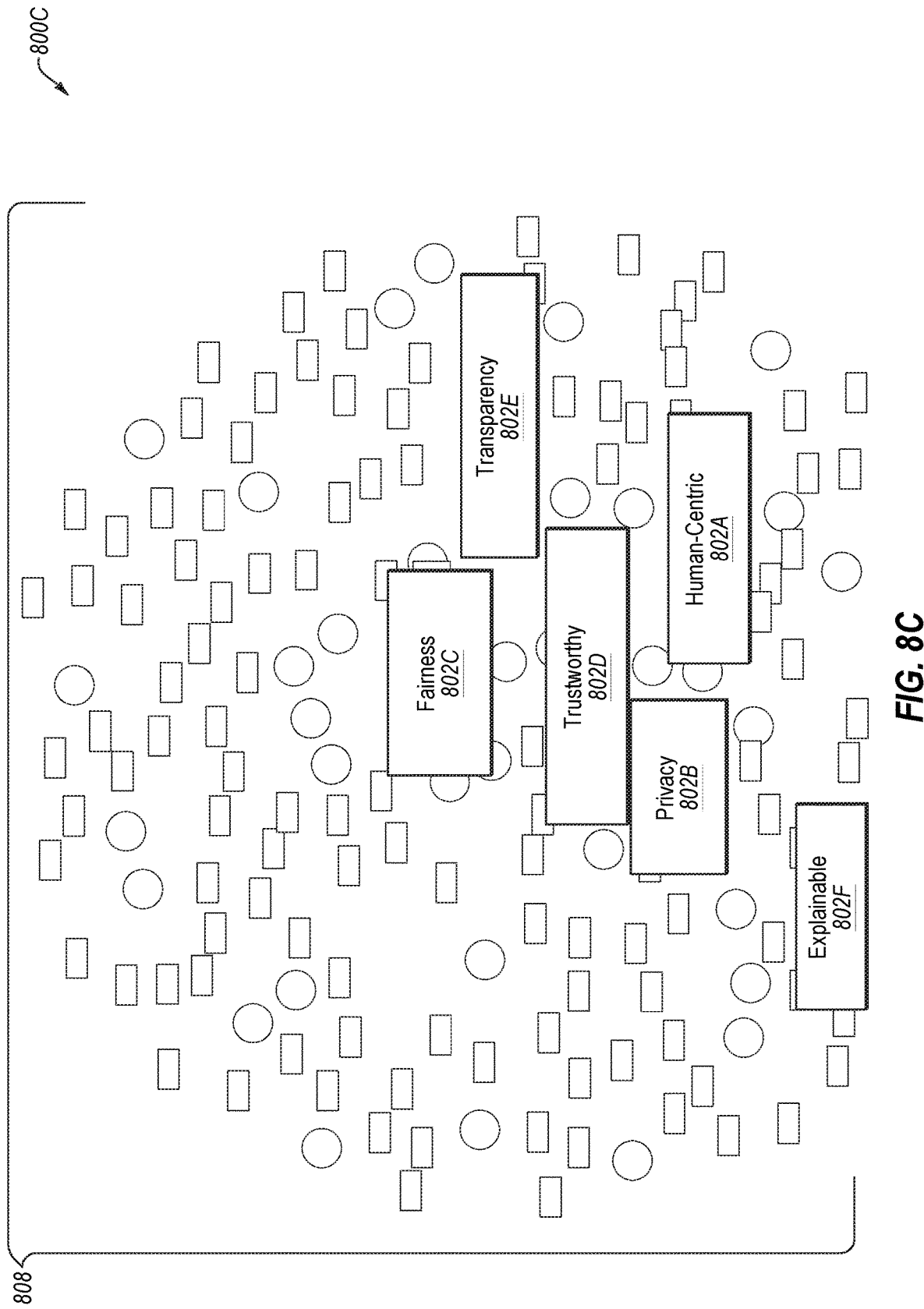

In some embodiments, the topic-model representation 124 may include a representation of the topic model, the topics of the topic model, and/or associations between the electronic documents 102 and the topics of the topic model. For example, the topic-model representation 124 may include a representation of theme coverage which may indicate how the themes (e.g., as provided by the user) and/or the topics (e.g., as determined by the topic analyzer 120) are represented by the electronic documents 102. For example, the topic-model representation 124 may include a representation of a number or proportion of electronic documents 102 that relate to each of the themes and/or topics. In some embodiments, the topic-model representation 124 may represent the number and/or proportion in a visual manner e.g., with different size objects and/or different proximities between objects. FIGS. 8A-8C illustrate example representations of theme coverage of electronic documents such as may be included in the topic-model representation 124. Additionally or alternatively, the topic-model representation 124 may include a representation of how different topics and/or documents associated with the topics may be interrelated.

As an example of operations of the environment 100, the topic analyzer 120 may obtain the theme texts 104, e.g., from a user. The topic analyzer 120 may determine candidate seed texts that are semantically similar to the theme texts 104 using the embedding dictionary 110. In some embodiments, the topic analyzer 120 may present the candidate seed texts to the user for confirmation, alteration, and/or additions. Additionally or alternatively, the topic analyzer 120 may filter the candidate seed texts, e.g., based on occurrences of the candidate seed texts in the electronic documents 102. The topic analyzer 120 may identify seed texts from among the candidate seed texts (e.g., based on input from the user and/or based on occurrences (or non-occurrences) of the candidate seed texts in the electronic documents 102). Additional detail regarding the identification of seed texts is given below with respect to FIG. 3.

Following the identification of the seed texts, the topic analyzer 120 may generate and/or update a weight vector including weights corresponding to multiple texts. The topic analyzer 120 may update the weight vector such that weights corresponding to the seed texts are greater than weights corresponding to other texts.

To continue the example, the topic analyzer 120 may use the weight vector to perform topic inference to generate the topic model. Based on the increased weights of the seed texts, the topic model may include topics biased in favor of the seed texts. For example, the seed texts may be included in the topic terms of the topics of the topic model. An example of a representation of a topic model is illustrated in FIG. 4.

Additionally or alternatively, the topic analyzer 120 may generate the topic-model representation 124 which may include a representation of how the electronic documents 102 relate to the theme texts 104 and/or the topics. For example, the topic-model representation 124 may include a representation of how many of the electronic documents 102 relate to each theme of the theme texts 104. Examples representations of topic model representations are illustrated in FIGS. 8A-8C.

Additionally or alternatively, the topic analyzer 120 may take topic terms from a topic model and generate refined seed texts. The topic analyzer 120 may generate refined seed texts based on a semantic similarity between the seed texts and the topic terms of the topic model. For example, the topic analyzer 120 may identify additional seed texts that are semantically similar to the seed texts. As another example, the topic analyzer 120 may remove inconsistent topic terms based on a semantic dissimilarity between the seed texts and the inconsistent topic terms.

After identifying the refined seed texts, the topic analyzer 120 may generate and/or update a weight vector based on the refined seed texts. The topic analyzer 120 may generate a refined topic vector based on the new and/or updated weight vector.

Modifications, additions, or omissions may be made to the environment 100 of FIG. 1 without departing from the scope of the present disclosure. For example, the environment 100 may include more or fewer elements than those illustrated and described in the present disclosure. For example, the topic analyzer 120 may, in some embodiments, produce a topic model that may be output e.g., for use by another system and/or for subsequent use by the topic analyzer 120.

Figure 2:
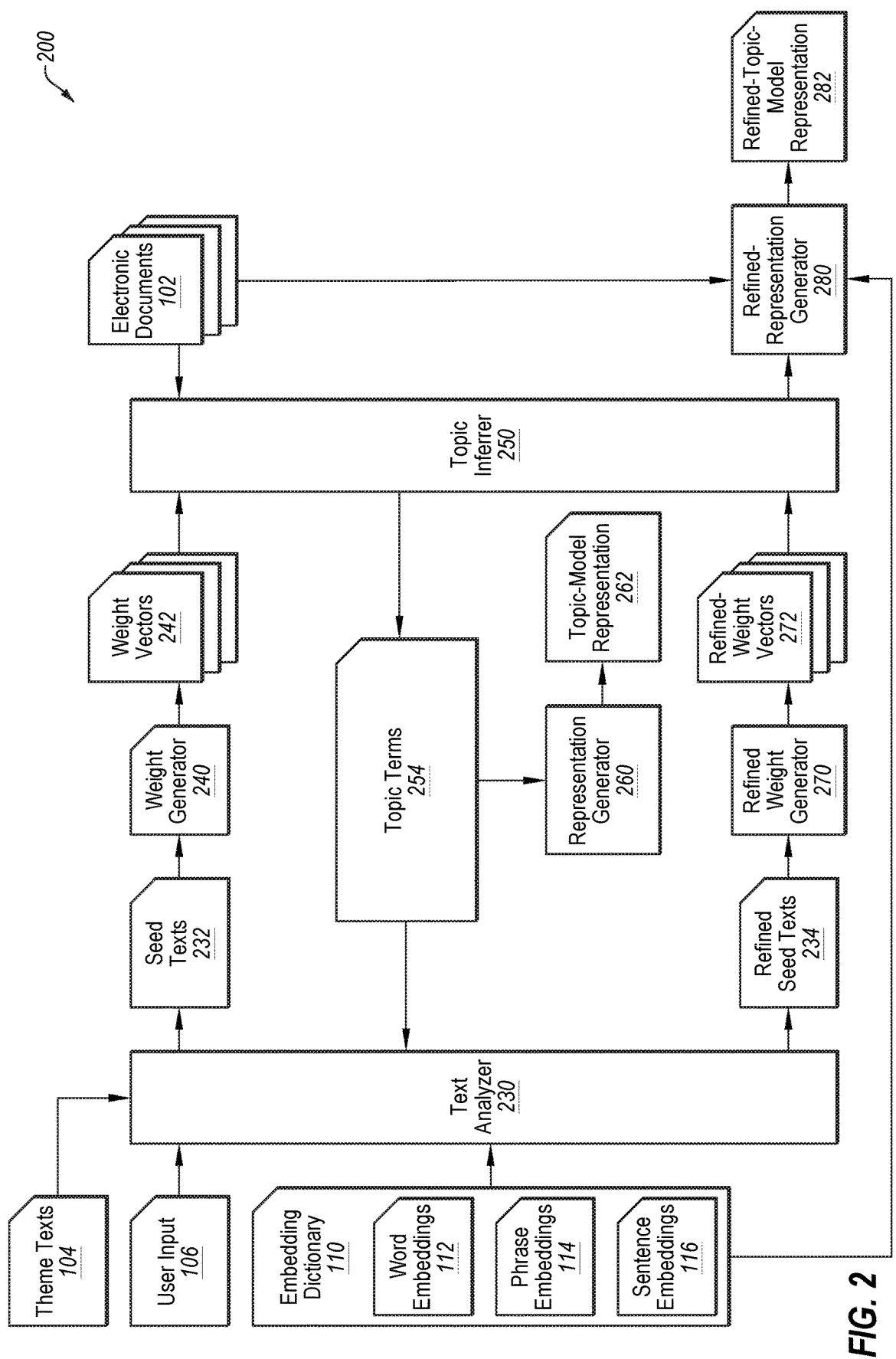
FIG. 2 is a diagram representing another example environment related to topic analysis using semantic similarity.

FIG. 2 is a diagram representing another example environment related to topic analysis using semantic similarity according to at least one embodiment described in the present disclosure. The environment 200 may include a text analyzer 230, a weight generator 240, a topic inferrer 250, a representation generator 260, a refined-weight generator 270, and a refined-representation generator 280. In general, the text analyzer 230 may take the theme texts 104, the user input 106, and the embedding dictionary 110 as inputs and generate seed texts 232. The weight generator 240 may take the seed texts 232 as an input and generate weight vectors 242. The topic inferrer 250 may take the weight vectors 242 and the electronic documents 102 as inputs and generate a topic model based on the electronic documents 102 and the weight vectors 242. The topic model may include an algorithm and/or data structure used by the topic inferrer 250. The topic inferrer 250 may output topic terms 254 of the topic model. The representation generator 260 may take the topic model and/or the topic terms 254 as an input and generate a topic-model representation 262. The text analyzer 230 may take the theme texts 104, the user input 106, the embedding dictionary 110 and/or topic terms 254 of the topic model as inputs and generate refined seed texts 234. The refined-weight generator 270 may take the refined seed texts 234 as an input and generate refined-weight vectors 272. The topic inferrer 250 may take the refined-weight vectors 272 and the electronic documents 102 as inputs and generate a refined topic model based on the refined-weight vectors 272 and the electronic documents 102. The refined topic model may include an algorithm and/or data structure used by the topic inferrer 250. The refined-representation generator 280 may take the electronic documents 102, the embedding dictionary 110, and the refined topic model as inputs and generate a refined-topic-model representation 282.

In some embodiments, each of the electronic documents 102, the theme texts 104, the user input 106, and the embedding dictionary 110 may be the same as, or substantially similar to what was describe above with respect to FIG. 1. In some embodiments, each of the text analyzer 230, the weight generator 240, the topic inferrer 250, the representation generator 260, the refined-weight generator 270, and the refined-representation generator 280 may be included in an embodiment of the topic analyzer 120 of FIG. 1.

Additionally or alternatively, in some embodiments, the embedding dictionary 110 may include one or more dictionaries of words, phrases, and/or sentences and embedding vectors corresponding thereunto. The embedding dictionary 110 may include word embeddings 112, phrase embeddings 114, and sentence embeddings 116. The word embeddings 112 may include multi-dimensional vectors of numbers corresponding to words. As described above with regard to the embedding dictionary 110 of FIG. 1, the multi-dimensional vectors may, by vector distance between two or more vectors, indicate a semantic similarity between two or more words.

Similarly, the phrase embeddings 114 may include multi-dimensional vectors of number that may be used to determine semantic similarity. However, in contrast with the word embeddings 112 which may include vectors corresponding to single words, the phrase embeddings 114 may include vectors corresponding to phrases, bi-grams, tri-grams n-grams or groups of words. For example, the phrase embeddings 114 may include a vector corresponding to the text "natural language processing." Similar to the phrase embeddings 114, the sentence embeddings 116 may include multi-dimensional vectors of numbers, which may be used to determine semantic similarity, corresponding to sentences.

The text analyzer 230 may include code and routines configured to enable a computing device to perform one or more operations with respect to generating the seed texts 232 based on one or more of the theme texts 104, the user input 106, and the embedding dictionary 110. Additionally or alternatively, the text analyzer 230 may be implemented using hardware including a processor, a microprocessor (e.g., to perform or control performance of one or more operations), a field-programmable gate array (FPGA), or an application-specific integrated circuit (ASIC). In some other instances, the text analyzer 230 may be implemented using a combination of hardware and software. In the present disclosure, operations described as being performed by the text analyzer 230 may include operations that the text analyzer 230 may direct a corresponding system to perform.

In some embodiments, the text analyzer 230 may generate the seed texts 232 based on one or more of the theme texts 104, the user input 106, and the embedding dictionary 110. For example, the text analyzer 230 may obtain the theme texts 104, and identify texts that are semantically similar to the theme texts 104 based on vector distances between an embedding vector of the theme texts 104 and embedding vectors of the semantically similar texts. The identified texts may be include in the seed texts 232. The embedding vectors may be obtained from and/or based on the embedding dictionary 110. Additionally or alternatively, the text analyzer 230 may obtain and use user input 106 to identify texts to include in the seed texts 232. An example method 300 for identifying seed texts is given with respect to FIG. 3.

In some embodiments, the seed texts 232 may include one or more texts that may be related to the theme texts 104. For example, the seed texts 232 may include texts that are semantically similar to the theme texts 104. There may be a set of seed texts 232 corresponding to each of the theme texts 104. For example, if a user provides three theme texts 104, corresponding to three different themes of interested to the user, there may be three sets of seed texts 232, each including texts related to one of the themes of the theme texts 104.

The weight generator 240 may include code and routines configured to enable a computing device to perform one or more operations with respect to generating the weight vectors 242 based on the seed texts 232. Additionally or alternatively, the weight generator 240 may be implemented using hardware including a processor, a microprocessor (e.g., to perform or control performance of one or more operations), a field-programmable gate array (FPGA), or an application-specific integrated circuit (ASIC). In some other instances, the weight generator 240 may be implemented using a combination of hardware and software. In the present disclosure, operations described as being performed by the weight generator 240 may include operations that the weight generator 240 may direct a corresponding system to perform.

In some embodiments, the weight generator 240 may generate the weight vectors 242 such that when the weight vectors 242 are used in topic inference, the topic inference will be biased toward the seed texts 232. For example, the weight generator 240 may generate a vector of weights corresponding to multiple texts. The vector of weights may be initially normalized such that all of the weights are equal. Then, the weight generator 240 may increase weights corresponding to the seed texts 232. As another example, the weight generator 240 may generate a vector including weights corresponding to the seed texts 232. Then the weight generator 240 may add weights (e.g., with a lower, value) corresponding to other texts to the vector.

In some embodiments, the weight vectors 242 may include multi-dimensional vectors of numbers (e.g., numbers between negative one and one). There may be one weight vector 242 corresponding to each of the theme texts 104. For example, if there are three theme texts 104 there may be three weight vectors 242, one corresponding to each of theme texts 104. Each of the three theme texts 104 may correspond to a set of seed texts 232. And each of the three weight vectors 242 may include weights corresponding to a corresponding set of the seed texts 232.

The topic inferrer 250 may include code and routines configured to enable a computing device to perform one or more operations with respect to generating a topic model representing topics of the electronic documents 102. Additionally or alternatively, the topic inferrer 250 may be implemented using hardware including a processor, a microprocessor (e.g., to perform or control performance of one or more operations), a field-programmable gate array (FPGA), or an application-specific integrated circuit (ASIC). In some other instances, the topic inferrer 250 may be implemented using a combination of hardware and software. In the present disclosure, operations described as being performed by the topic inferrer 250 may include operations that the topic inferrer 250 may direct a corresponding system to perform.

In some embodiments, the topic inferrer 250 may identify topics into which to categorize the electronic documents 102 and/or categorize the electronic documents 102 into the topics. The topic inferrer 250 may identify the categories according to any suitable topic modeling technique, for example, Latent Dirichlet Allocation (LDA) or extensions of LDA.

In some embodiments, the topic inferrer 250 may use Bayesian inference techniques in identifying the topics. For example, the topic inferrer 250 may use inferential statistics starting from a prior knowledge vector to arrive at a solution. The topic inferrer 250 may use the weight vectors 242 as the prior knowledge vector. Using the weight vectors 242 as the prior knowledge vector may result in the topics of the topic model being biased toward the seed texts 232. For example, the topic terms 254 of the topic model may be related to, and/or include, the seed texts 232.

In some embodiments, the topic inferrer 250 may select a hyper-parameter, e.g., a number of topics into which to categorize the electronic documents 102. The selection of the number of topics may be such that the resulting topic model may satisfy thresholds of topic coherence and/or topic stability. Additionally or alternatively, the number of topics may be heuristically determined and/or based on user input.

In some embodiments, the topic model may include an algorithm and/or data structure representing associations between texts and the electronic documents 102. Additionally or alternatively the topic model may include topics into which the electronic documents 102 may be categorized. Each of the electronic documents 102 may be categorized into more than one topic. The topic model may include associations between the electronic documents 102 and the topics into which they are categorized.

In some embodiments, each of the topics of the topic model may include, and/or be characterized by, the topic terms 254. The topic terms 254 may include texts (e.g., words, phrases and/or n-grams). The topic terms 254 may be initially ranked according to numbers of occurrences of the topic terms 254 in the electronic documents 102 of the corresponding topic. Additionally or alternatively, the topic terms 254 may be ranked (or reranked by the topic inferrer 250) according to relevance in characterizing the various topics. For example, a topic may be characterized by the texts "fairness," and "impartiality" and "objectivity." "Fairness" and "impartiality" may be more characteristic of the topic (e.g., because more of the documents may include "fairness" and "impartiality") than "objectivity." Thus, "fairness" and "impartiality" may be ranked higher than "objectivity." In some embodiments, topic terms 254 that satisfy a threshold may be identified as topic labels. For example, the top-ranking three topic terms 254 of each topic may be included in topic labels for the topic. Topic labels may be used to concisely represent the topic to an observer.

In some embodiments, the representation generator 260 may include code and routines configured to enable a computing device to perform one or more operations with respect to generating the topic-model representation 262 to represent the topic model. Additionally or alternatively, the representation generator 260 may be implemented using hardware including a processor, a microprocessor (e.g., to perform or control performance of one or more operations), a field-programmable gate array (FPGA), or an application-specific integrated circuit (ASIC). In some other instances, the representation generator 260 may be implemented using a combination of hardware and software. In the present disclosure, operations described as being performed by the representation generator 260 may include operations that the representation generator 260 may direct a corresponding system to perform.

In some embodiments, the representation generator 260 may organize the topic terms 254, the topic labels, and/or names of the electronic documents 102 into the topic-model representation 262, which may represent the topic model. In some embodiments, the representation generator 260 may be the same as or substantially similar to the refined-representation generator 280 described below. In some embodiments, though not illustrated the representation generator 260 may take the electronic documents 102 and/or the embedding dictionary 110 as inputs.

In some embodiments, the topic-model representation 262 may be an interactive representation of the topic model. For example, the topic-model representation 262 may be presented on a graphical user interface (GUI) which may allow a user to select a topic and view topic terms and/or electronic documents associated with the topic. An example representation of a topic model is given in FIG. 4. Additionally or alternatively, the topic representation of FIG. 7 and/or the theme coverage representations of FIG. 8 may be examples of the topic-model representation 262.

In some embodiments, the text analyzer 230 may generate the refined seed texts 234 based on the topic terms 254, the theme texts 104, the user input 106, the embedding dictionary 110, and/or the seed texts 232. For example, the text analyzer 230 may use the topic terms 254, the theme texts 104, the user input 106, the embedding dictionary 110, and/or the seed texts 232 to generate the refined seed texts 234 in a manner similar to what was described above with regard to generating the seed texts 232. For example, the text analyzer 230 may identify texts (e.g., from among the topic terms 254) that are semantically similar to the seed texts 232 and/or the theme texts 104 (based on semantic similarity determinations made using the embedding dictionary 110). In some embodiments, the text analyzer 230 may select the refined seed texts 234 according to the refined seed texts 234 satisfying a similarity threshold with the theme texts 104, the seed texts 232 and/or the topic terms 254. For example, for a particular seed text 232, the three most semantically similar texts (e.g., of the topic terms 254) (e.g., as measured by vector distance between an embedding vector of the particular seed text 232 and the embedding vectors of the topic terms 254) may be selected for inclusion in the refined seed texts 234. Additionally or alternatively, in some embodiments, the selection of the refined seed texts 234 may be based at least in part on the user input 106. For example, a user may indicate that a particular topic term should not be included in the refined seed texts 234 despite a semantic similarity between the particular topic term and the seed texts 232. An example of a method for identifying refined seed texts is illustrated below with respect to FIG. 5.

In some embodiments, the refined seed texts 234 may be the same in form as, or substantially similar in form to, the seed texts 232 described above. The refined seed texts 234 may include different texts than the seed texts 232, e.g., based on the operation of the text analyzer 230 based on the topic terms 254 and the seed texts 232.

The refined-weight generator 270 may include code and routines configured to enable a computing device to perform one or more operations with respect to generating the refined-weight vectors 272 based on the refined seed texts 234. Additionally or alternatively, the refined-weight generator 270 may be implemented using hardware including a processor, a microprocessor (e.g., to perform or control performance of one or more operations), a field-programmable gate array (FPGA), or an application-specific integrated circuit (ASIC). In some other instances, the refined-weight generator 270 may be implemented using a combination of hardware and software. In the present disclosure, operations described as being performed by the refined-weight generator 270 may include operations that the refined-weight generator 270 may direct a corresponding system to perform.

In some embodiments, the refined-weight generator 270 may be the same as or substantially similar to the weight generator 240 described above. Though illustrated as two separate elements in FIG. 2, in some embodiments, the weight generator 240 and the refined-weight generator 270 may be a single element.

In some embodiments, the refined-weight vectors 272 may be the same as, or substantially similar to, in form and/or function, the weight vectors 242 described above. The refined-weight vectors 272 may include different weights than the weight vectors 242, e.g., based on refined seed texts 234 including different texts than the seed texts 232.

Figure 5:
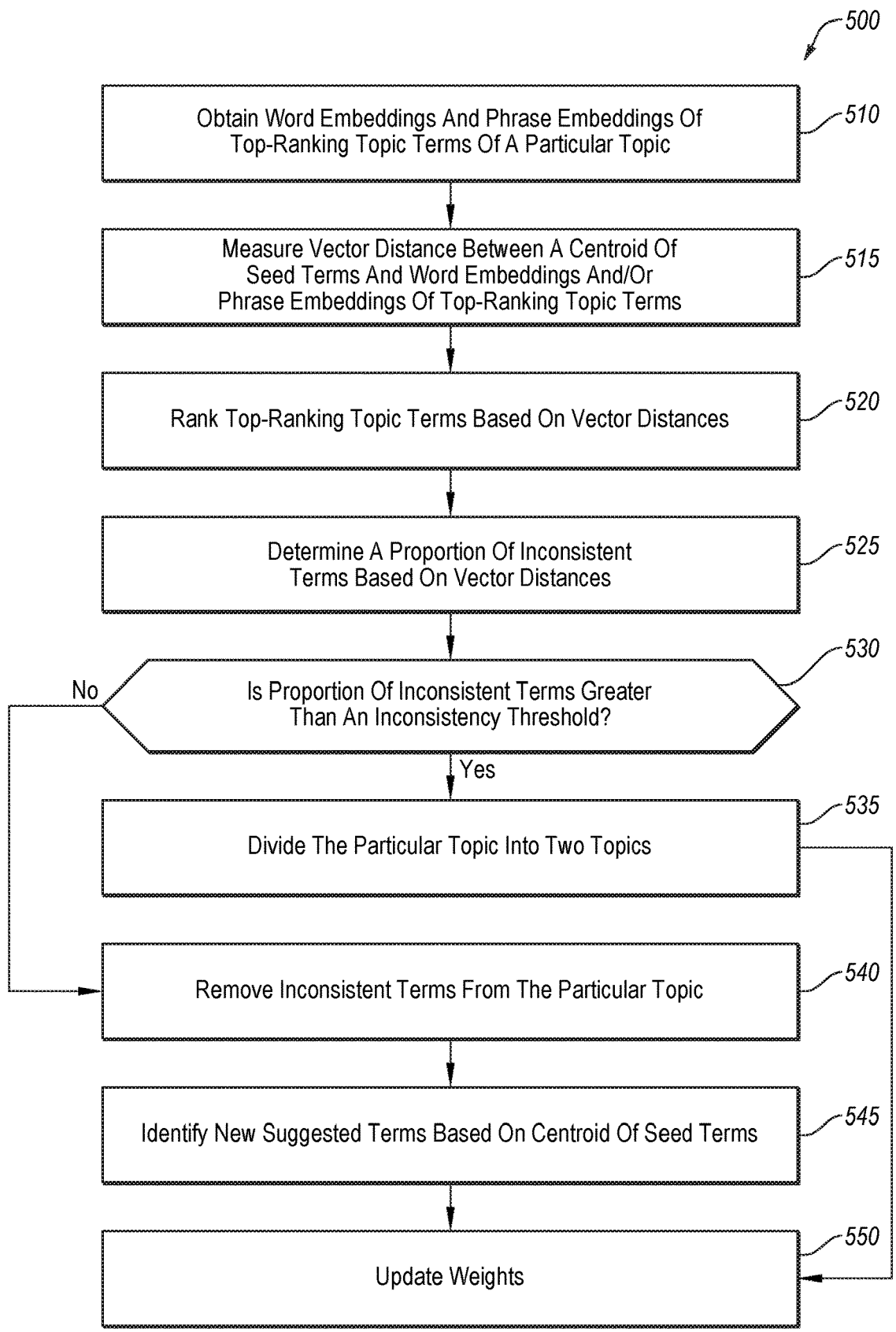
FIG. 5 is a flowchart of an example method of updating weights for topic inference.

An example of how the refined seed texts 234 may be generated based on the topic terms 254 and how the refined-weight vectors 272 may be generated based on the refined seed texts 234 is given with respect to FIG. 5.

In some embodiments, the topic inferrer 250 may generate the refined topic model based on the electronic documents 102 and the refined-weight vectors 272. The topic inferrer 250 may generate the refined topic model based on the refined-weight vectors 272 in the same way or a substantially similar way to the way the topic inferrer 250 generated the topic model based on the weight vectors 242 as described above.

In some embodiments, the refined topic model may be the same in form as, or substantially similar in form to the topic model described above. The refined topic model may differ in content from the topic model based on the refined-weight vectors 272 including different weights than the weight vectors 242.

The refined-representation generator 280 may include code and routines configured to enable a computing device to perform one or more operations with respect to generating the refined-topic-model representation 282 based on the refined topic model. Additionally or alternatively, the refined-representation generator 280 may be implemented using hardware including a processor, a microprocessor (e.g., to perform or control performance of one or more operations), a field-programmable gate array (FPGA), or an application-specific integrated circuit (ASIC). In some other instances, the refined-representation generator 280 may be implemented using a combination of hardware and software. In the present disclosure, operations described as being performed by the refined-representation generator 280 may include operations that the refined-representation generator 280 may direct a corresponding system to perform.

Figure 6:
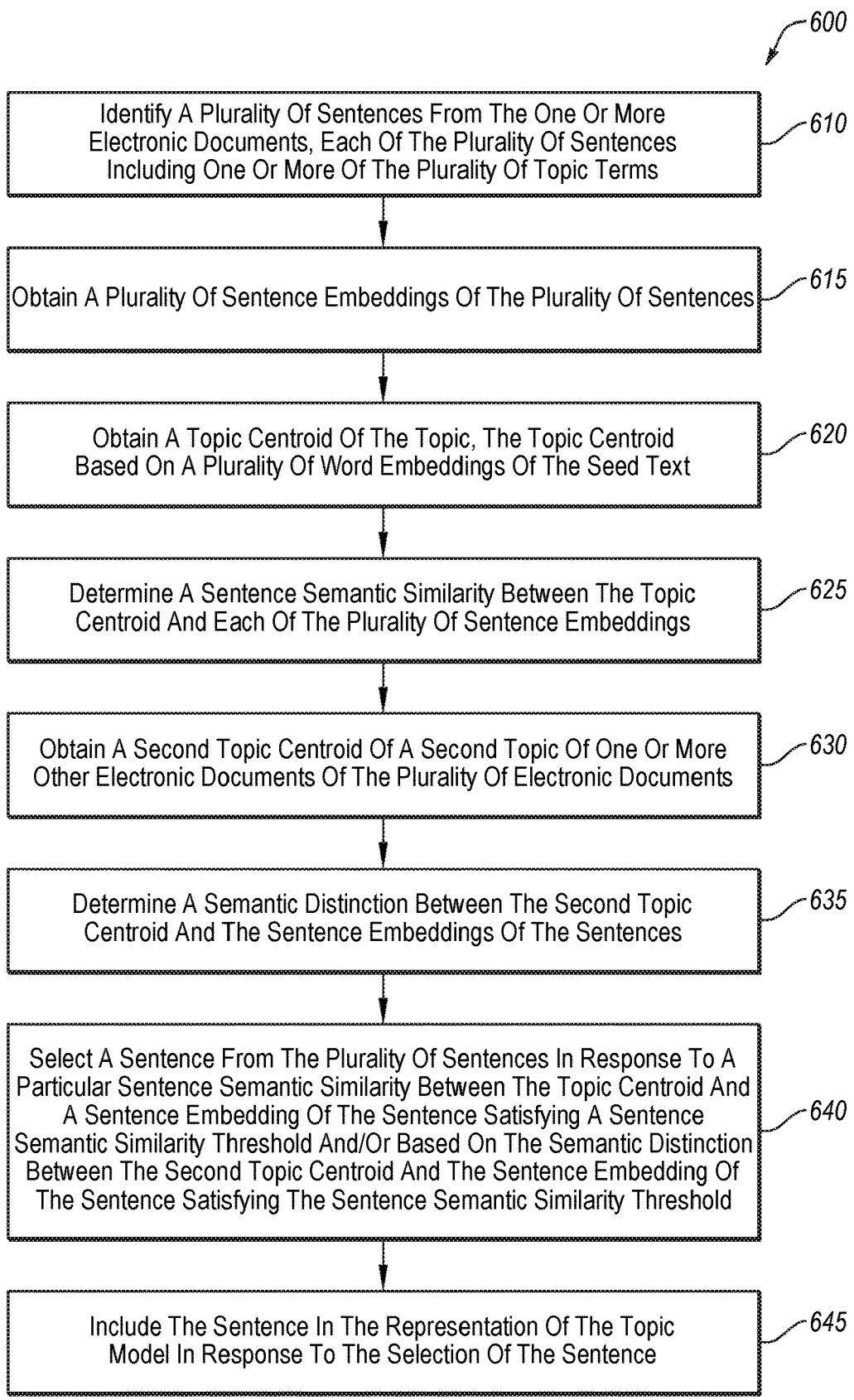
FIG. 6 is a flowchart of an example method of generating a representation of a topic of electronic documents.

In some embodiments, the refined-representation generator 280 may be the same in form as, or substantially similar in form to the representation generator 260 described above. In some embodiments, the refined-representation generator 280 may be substantially different from the representation generator 260. For example, the refined-representation generator 280 may generate the refined-topic-model representation 282 using additional steps. An example of a process that may be used to generate a refined-topic-model representation is illustrated in FIG. 6.

In some embodiments, the refined-topic-model representation 282 may include a visual representation of the refined topic model and/or the topics of the refined topic model. In some embodiments, the refined-topic-model representation 282 may include representations of the electronic documents 102 and/or associations between the topics of the refined topic model and the electronic documents 102. Additionally or alternatively, in some embodiments, the refined-topic-model representation 282 may include one or more texts associated with the topics and/or the electronic documents 102. For example, the refined-topic-model representation 282 may include sentences and/or phrases representative of the topics taken from the electronic documents 102. Examples of refined-topic-model representation 282 are illustrated below with regard to FIGS. 8A-8C.

Modifications, additions, or omissions may be made to the environment 200 of FIG. 2 without departing from the scope of the present disclosure. For example, the environment 200 may include more or fewer elements than those illustrated and described in the present disclosure. Moreover, although described separately, in some embodiments, two or more of the text analyzer 230, the weight generator 240, the topic inferrer 250, the representation generator 260, the refined-weight generator 270, and/or the refined-representation generator 280 may be part of a same system or divided differently than described. The delineation between these and other elements in the description is not limiting and is meant to aid in understanding and explanation of the concepts and principles used in the present disclosure. For example, the topic inferrer 250 may, in some embodiments, produce a topic model, and/or refined topic model that may be output e.g., and/or for subsequent use by the topic analyzer 120.

Figure 3:
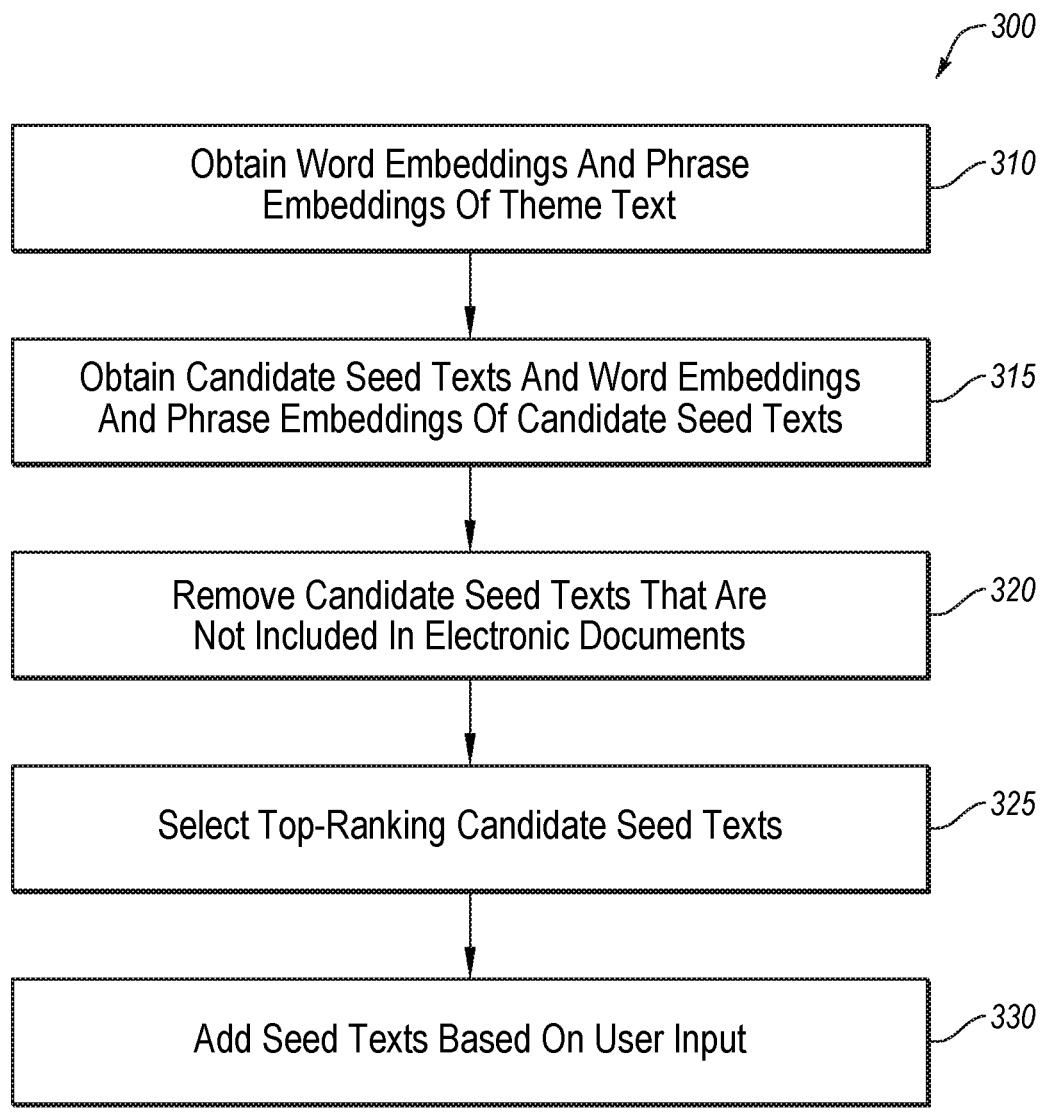
FIG. 3 is a flowchart of an example method of identifying seed texts.

FIG. 3 is a flowchart of an example method 300 of identifying seed texts, according to at least one embodiment described in the present disclosure. The method 300 may be performed by any suitable system, apparatus, or device. For example, the environment 100 of FIG. 1, the environment 200 of FIG. 2, the text analyzer 230 of FIG. 2, and/or the computing system 900 of FIG. 9 (e.g., as directed by one or more modules) may perform one or more of the operations associated with the method 300. Although illustrated with discrete blocks, the steps and operations associated with one or more of the blocks of the method 300 may be divided into additional blocks, combined into fewer blocks, or eliminated, depending on the particular implementation.

The method 300 may begin at block 310, at block 310, word embeddings and/or phrase embeddings of one or more theme texts may be obtained. The theme texts 104 of FIGS. 1 and 2 may be an example of the theme texts of block 310. The word embeddings and/or phrase embeddings of block 310 may be obtained from an embedding dictionary, for example, the embedding dictionary 110 of FIGS. 1 and 2.

At block 315, candidate seed texts may be obtained. The candidate seed texts may be obtained from a dictionary including texts. Additionally or alternatively, at block 315, word embeddings and/or phrase embeddings of the candidate seed texts may be obtained. The word embeddings and/or phrase embeddings of the candidate seed texts may be obtained from an embedding dictionary, for example, the embedding dictionary 110 of FIGS. 1 and 2. The candidate seed texts that are obtained may be selected based on a vector distance between the word embeddings of the candidate seed texts and the word embeddings of the theme texts. For example, texts corresponding to the ten embedding vectors that are closest to the embedding vector corresponding to each of the theme texts may be selected as a candidate theme text.

At block 320, candidate seed texts that are not included in electronic documents may be removed. For example, electronic documents (e.g., the electronic documents 102 of FIGS. 1 and 2) may be obtained. The electronic documents may be the corpus of documents that are intended to be categorized by a topic inference technique according to topics that are based on the seed texts identified by the method 300. The electronic documents may be searched for occurrences of the candidate seed texts. Any candidate seed texts that do not satisfy an occurrence threshold may be removed from the candidate seed texts. For example, any candidate seed text that does not occur a certain number of times, or in a certain percentage of documents may be removed from the candidate seed texts.

At block 325, top-ranking candidate seed texts may be selected. For example, the word embeddings and/or phrase embeddings of the candidate seed texts may be compared with the word embeddings and/or phrase embeddings of the theme texts. For example, a vector distance (e.g., a cosine distance) may be determined between the word embeddings and/or phrase embedding of the theme texts and the word embeddings and/or phrase embeddings of each of the candidate seed texts. The candidate seed texts may be ranked according to the vector distances such that the candidate seed texts that are most semantically similar to each of the theme texts are ranked highest. After ranking the candidate seed texts, the candidate seed texts that satisfy a threshold may be selected to become seed texts. For example, the top three or top ten candidate seed texts with respect to each of the theme texts may be selected to be included in seed texts. Additionally or alternatively, candidate seed texts with word embeddings and/or phrase embeddings within a threshold vector distance from the word embeddings and/or phrase embeddings of each of the theme texts may be selected for inclusion in the seed texts.

At block 330, additional seed texts may be added to the seed texts based on user input. For example, the seed texts may be presented to a user. The user may provide additional seed texts for inclusion in the seed texts. Additionally or alternatively, in some embodiments, the user may remove some of the seed texts or alter some of the seed texts.

Modifications, additions, or omissions may be made to the method 300 without departing from the scope of the present disclosure. For example, the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

FIG. 4 illustrates an example representation of a topic model 400, according to at least one embodiment described in the present disclosure. The topic model 400 includes topic labels 402 for each of four topics. Additionally, the topic model 400 includes topic terms 404 corresponding to the first of the four topics. The topic terms 404 may characterize the first topic. The other three topics may also have topic terms that are not illustrated in FIG. 4. The topic terms of the other three topics may be characteristic of each of the other three topics respectively. The topic labels 402 for each of the topics may be the highest-ranking topic terms of that topic.

Additionally, the topic model 400 includes the electronic documents names 406 that may be related to the first topic. For example, the four electronic documents may be categorized according to the first topic. The other three topics may also have electronic documents associated with them that are not illustrated in FIG. 4. Additionally, the topic model 400 includes document relevance scores 408. The documents relevance scores 408 may indicate a degree of association between the corresponding electronic document and the topic. For example, the second electronic document may have a score of 66.67% based on a degree of association between the second electronic document and the first topic. For example, based on occurrences of the topic terms 404 (e.g., of the first topic) in the second electronic document, and/or the occurrences of the topic terms of other topics, the second electronic document may be scored relative to the first topic.

In some embodiments, the four topics characterized by the topic labels 402 (and the topic terms, both those illustrated with respect to the first topic, and those unillustrated with respect to the other three topics) may have been identified by the topic inference technique as part of identifying the four topics. For example, the topic terms 404 of the first topic may be common to the electronic documents of the first topic and uncommon in electronic documents of the other three topics. The topic inference technique may have identified the four topics based on the commonality and uncommonality of texts in the electronic documents.

In FIG. 4, four topics are illustrated. However, a topic model according to embodiments of the present disclosure may include any number of topics. As described above, the number of topics may be selected to satisfy thresholds related to topic coherence and/or topic stability. For example, there may be twenty topics.

Additionally, in FIG. 4 three topic labels 402 are illustrated. A topic model according to embodiments of the present disclosure may include any number of topic labels 402. The number of topic labels 402 may be determined based on a number which may be comprehensible to a user or based on a representation of the topic model. For example, three topic labels may be selected based on a size of a visual representation of the topic model 400. In some embodiments, there may be no topic labels 402; e.g., none of the topic terms 404 may be identified as topic labels.

Additionally, in FIG. 4, ten topic terms 404 are illustrated. A topic model according to embodiments of the present disclosure may include any number of topic terms 404. The number of topic terms 404 may be determined before the topic model 400 is generated, e.g., as a hyper-parameter. Additionally or alternatively, the number of topic terms 404 may be determined by the topic inference process itself. For example, there may be twenty terms that are common to electronic documents categorized in a particular topic. All twenty terms may be identified as topic terms 404 by the topic inference technique in the identification of the particular topic.

Additionally, in FIG. 4, four electronic document names 406 are illustrated. A topic model according to embodiments of the present disclosure may include any number of electronic documents names 406. The number of electronic documents names 406 may be based on a number of electronic documents are categorized according to each of the topics, which may be related to the total number of electronic documents that are categorized by the topic model. For example, if a million electronic documents are categorized into twenty topics, there may be fifty thousand electronic documents relating to each of the topics. Additionally or alternatively, one electronic document may be associated with, and/or categorized according to more than one topic.

Modifications, additions, or omissions may be made to the topic model 400 without departing from the scope of the present disclosure. For example, the elements of the topic model 400 may be arranged in differing order. Additionally or alternatively, the topic model 400 may include more or fewer elements than those illustrated and described in the present disclosure.

FIG. 5 is a flowchart of an example method 500 of updating weights for topic inference, according to at least one embodiment described in the present disclosure. The method 500 may be performed by any suitable system, apparatus, or device. For example, one or more of the environment 100 of FIG. 1, the environment 200 of FIG. 2, the text analyzer 230 of FIG. 2, the refined-weight generator 270 of FIG. 2 and/or the computing system 900 of FIG. 9 (e.g., as directed by one or more modules) may perform one or more of the operations associated with the method 500. Although illustrated with discrete blocks, the steps and operations associated with one or more of the blocks of the method 500 may be divided into additional blocks, combined into fewer blocks, or eliminated, depending on the particular implementation.

The method 500 may begin at block 510, where word embeddings and/or phrase embeddings of top-ranking topic terms of a particular topic, as ranked during the initial topic generation, may be obtained. The topic terms 254 of FIG. 2 may be an example of the topic terms of block 510. The topic terms of a particular topic may be ranked according to occurrences in the electronic documents associated with the particular topic.

A subset of the top-ranking terms may be selected based on the top-ranking terms satisfying a threshold. For example, the top twelve topic terms may be selected. In some embodiments, one or more of the top-ranking terms may also be included as topic labels, e.g., the topic labels 256 of FIG. 2 may include the top-ranking topic terms. Word embeddings and/or phrase embeddings may be obtained for each of the top-ranking topic terms. The word embeddings and/or phrase embeddings may be obtained from an embedding dictionary, for example, the embedding dictionary 110 of FIG. 2. The embeddings may be obtained to determine the semantic similarity between the subset of the top-ranking terms and the seed terms and/or the theme.

At block 515, the vector distance between a centroid of seed terms and word embeddings and/or phrase embeddings of top-ranking topic terms may be determined to determine the semantic similarity between the subset of the top-ranking terms and the seed terms. For example, a topic centroid may be identified. The topic centroid may be a vector based on the embedding vectors of one or more texts associated with a topic. For example, the topic centroid may be an average vector of all the embedding vectors of all the seed texts corresponding to a topic. As another example, the topic centroid may be an average vector of all the embedding vectors of all the top-ranking topic terms of a topic. Additionally or alternatively, the topic centroid may include a weighted average of the embedding vectors of all of the topic terms. The embedding vectors may be weighted based on the ranking included in the topic model.

A vector distance between one or more texts associated with a topic, and the topic centroid may be determined. For example, a vector distance between each of the embeddings vectors of the topic terms of a topic and the topic centroid of the topic may be determined. The vector distance may indicate semantic similarity in which a closer distance indicates greater semantic similarity.

At block 520, top-ranking topic terms may be ranked (or reranked) based on the vector distances. For example, the topic terms may be reordered based on the vector distance of their embedding vectors to the topic centroid. For example, a particular topic term may have an embedding vector that is closer to the topic centroid (e.g., that is based on the seed texts, that may be based on the theme text provided by the user) than other topic terms. The particular topic term may be reranked to reflect its proximity to the topic centroid. Proximity of the embedding vectors of the topic terms to the topic centroid may represent semantic similarity between the respective topic terms and the seed texts. Thus, topic terms that have embedding vectors that are relatively close to the topic centroid may be semantically similar to the seed texts.

At block 525, a proportion of inconsistent terms may be determined based on vector distances. For example, embedding vectors of each of the topic terms may be compared to the topic centroid and vector distance may be determined between each of the embedding vectors of the topic terms and the topic centroid. There may be a particular vector distance identified as a term inconsistency threshold, and any topic terms that have embedding vectors that are greater than the particular vector distance away from the topic centroid may be identified as "inconsistent" with respect to the topic. Because proximity between embedding vectors may represent semantic similarity, topic terms that have embedding vectors that are relatively distant from the topic centroid (e.g., further than the particular vector distance) may be semantically dissimilar from the seed texts and/or may be inconsistent with the theme that the seed texts, the theme text, and/or the topic terms are being identified in order to characterize.

In cases where the topic centroid is based on the seed texts, this may serve to identify topic terms that are inconsistent with the seed texts, which may be based on the theme text provided by the user. In cases where the topic centroid is based on the top-ranking topic terms this may identify outliers that are semantically dissimilar from the top-ranking topic terms. Altogether, the proportion of inconsistent terms in a particular topic may indicate that the topic is semantically inconsistent and the topic model as a whole may benefit from correction of the topic (e.g. by removal of one or more inconsistent topic terms).

At block 530 a determination may be made relative to whether the proportion of inconsistent terms is greater than an inconsistency threshold. For example, if twenty percent of the topic terms are inconsistent with the topic centroid, it may be determined that the topic is inconsistent. If it is determined that the proportion of inconsistent terms of the particular topic satisfies the inconsistency threshold, the method 500 may proceed to the block 535. Alternatively, if it is determined that the proportion of inconsistent terms of the particular topic does not satisfy the inconsistency threshold, the method 500 may proceed to the block 540.

At the block 535, the particular topic may be divided into two or more topics. Dividing the particular topic into two or more topics may include identifying topic terms for each of the two or more topics. For example, one or more topic terms that are inconsistent with the topic centroid of the particular topic, may be identified as topic terms for a new topic. In some embodiments, the one or more topic terms may be examined to determine if they are semantically consistent each other before they are identified as topic terms for a new topic. The block 535 may be followed by the block 550.

At the block 540, inconsistent topic terms may be removed from the particular topic. For example, topic terms that satisfy an inconsistency threshold, may be removed from the particular topic. The block 540 may be followed by the block 545.

At block 545, new suggested terms may be identified based on the topic centroid. For example, one or more additional texts may be identified based on a proximity of the embedding vectors of the one or more additional texts to the topic centroid. For example, there may be a particular vector distance identified as a suggested term threshold, and one or more terms that have embedding vectors that are closer to the topic centroid than the particular vector distance may be identified as suggested terms. For example, one or more texts in an embedding dictionary that have embedding vectors that are relatively close to (e.g., within the particular distance from) the topic centroid may be identified. In cases where the topic centroid is based on the seed texts, this may serve to add additional topic terms to the topic to cause the topic to be more semantically similar to the seed texts. In cases where the topic centroid is based on the topic terms, this may serve to increase topic coherence.

At block 550, weights may be updated to reflect changes to the topics and/or topic terms of the topic terms. In some embodiments, the weight vectors 242 of FIG. 2 may be an example of the weight vector to be updated by block 550 and the refined-weight vectors 272 may be an example of the weight vector updated by block 550. For example, a weight vector may be generated and/or updated that includes new topics generated at block 535. Additionally or alternatively, the new and/or updated weight vector may include weights corresponding to the new topic terms identified at the block 545. Additionally or alternatively, the new and/or updated weight vector may include weights that reflect the removal of the inconsistent topic terms of block 540. The weight corresponding to an inconsistent topic term may be changed to be lower than other weights of the weight vector to reflect the removal of the topic term.

The new and/or updated weight vector, the weight vector may be configured to be used by a topic inference technique to generate a refined topic model. The refined topic model may be biased toward or away from topic terms, including the topic terms altered related to the method 500. For example, the new and/or updated weights may bias the refined topic model away from including a topic term in a topic if the topic term was removed from the topic related to the method 500.

Modifications, additions, or omissions may be made to the method 500 without departing from the scope of the present disclosure. For example, the operations of method 500 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

FIG. 6 is a flowchart of an example method 600 of generating a representation of a topic of electronic documents according to at least one embodiment described in the present disclosure. The method 600 may be performed by any suitable system, apparatus, or device. For example, one or more of the environment 100 of FIG. 1, the environment 200 of FIG. 2, the refined-representation generator 280 of FIG. 2, or the computing system 900 of FIG. 9 (e.g., as directed by one or more modules) may perform one or more of the operations associated with the method 600. Although illustrated with discrete blocks, the steps and operations associated with one or more of the blocks of the method 600 may be divided into additional blocks, combined into fewer blocks, or eliminated, depending on the particular implementation.

The method 600 may begin at block 610, where multiple sentences from the one or more electronic documents may be identified. Each of the multiple sentences may include one or more topic terms. For example, the multiple sentences may be identified based on occurrences of one or more of the topic terms in the multiple sentences. For example, the electronic documents may be parsed into sentences and sentences may be scored and/or ranked according to a number of occurrences of topic terms in each sentence. The scoring and/or ranking may be based on the ranking of the topic terms. For example, a first sentence including the top-ranking topic term may be score above a second sentence including the second-ranked topic term. The electronic documents 102 of FIG. 2 may be an example of the electronic documents of block 610. The topic terms 254 of FIG. 2 may be an example of the topic terms of block 610.

At the block 615, sentence embeddings of the multiple sentences may be obtained. An embedding dictionary (e.g., the embedding dictionary 110 of FIG. 2) may be used to determine a sentence embedding for each of the multiple sentences.

At block 620, a topic centroid of the topic may be obtained. The topic centroid may be based on seed texts (e.g., the seed texts 232 and/or the refined seed texts 234 of FIG. 2) that may have been used to derive weights that may have been used to generate the topic including the topic terms. Additionally or alternatively, the topic centroid may be based on multiple word embeddings of the topic terms. The topic centroid may represent an average vector between the embedding vectors of the seed texts and/or the topic terms.

At block 625, a sentence semantic similarity between the topic centroid and each of the multiple sentence embeddings may be determined. For example, a vector distance between the sentence embeddings of each of the sentences and the topic centroid may be determined.

At block 630, a second topic centroid of a second topic of one or more other electronic documents of the multiple electronic documents may be obtained. The second topic centroid may be the same in form as, or substantially similar in form to, the topic centroid of block 620. But, the second topic centroid may be based on a second topic. The second topic may be a topic of different subset of electronic documents than the subset of electronic documents associated with the topic centroid of block 620.

At block 635, a semantic distinction between the second topic centroid and each of the sentence embeddings of the sentences may be determined. For example, a vector distance between the sentence embeddings of each of the sentences and the second topic centroid may be determined. The vector distance between a particular sentence embedding and the topic centroid may represent a semantic similarity between the corresponding sentence and the seed texts on which the topic centroid is based. The semantic distinctions may represent a degree to which each of the sentences is dissimilar from other topics (e.g., the second topic), which may indicate a degree to which each of the sentences is uniquely related to the topic.

At block 640, a sentence may be selected from the multiple sentences in response to a particular sentence semantic similarity between the topic centroid and a sentence embedding of the sentence satisfying a sentence semantic similarity threshold. For example, the sentence may be selected from among the sentences based on a vector distance between the sentence embedding of the sentence satisfying the semantic similarity threshold. As an example, the semantic similarity threshold may include a vector distance threshold. Additionally or alternatively, the semantic similarity threshold may include a comparison with semantic similarities of other sentences. For example, the three most semantically similar sentences may satisfy the semantic similarity threshold.

Additionally or alternatively, the sentence may be selected in response to the semantic distinction between the second topic centroid and the sentence embedding of the sentence satisfying the sentence semantic similarity threshold. For example, the sentence may be selected from among the sentences based on a vector distance between the sentence embedding of the sentence satisfying the semantic similarity threshold. For example, the semantic similarity threshold may include a vector distance threshold. For example, the semantic similarity threshold may include a requirement that in addition to being within a vector distance threshold from the topic centroid, a sentence must be a particular vector distance away from any other topic centroid in order to satisfy the semantic similarity threshold. Because vector distances may represent semantic similarity, such a semantic similarity threshold may indicate that a sentence is semantically similar to the topic, and semantically separate, or distinct from other topics (e.g., the second topic).

As an example of the relationship between semantic similarity and semantic distinction, a first sentence may be semantically similar to a first topic and semantically distinct from other topics of the topic model. A second sentence may be semantically similar to each of the topics of the topic model. For example, the second sentence may be common to many electronic documents irrespective of the topic of the electronic documents. The first sentence may be selected while the second sentence may not be selected.

At block 645, in response to the selection of the sentence at block 640, the sentence may be included in a topic-model representation. The topic-model representation 262 and/or the refined-topic-model representation 282 of FIG. 2 may be an example of the topic-model representation of block 645. Additionally or alternatively, the topic representation 700 of FIG. 7 may be an example of the topic-model representation of block 645.

Modifications, additions, or omissions may be made to the method 600 without departing from the scope of the present disclosure. For example, in some embodiments, the block 630 and the block 635 may be omitted. In these embodiments, the selection of the sentence may be based on the semantic similarity without regard for a semantic distinction. For another example, the operations of method 600 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

FIG. 7 illustrates an example topic representation 700 of a particular topic of electronic documents, according to at least one embodiment described in the present disclosure. The topic representation 700 includes a top-ranking topic terms 702. The top-ranking topic terms 702 may include one or more topic terms identified in the topic model. The top-ranking topic terms 702 may be the top-ranking, in terms of frequency of occurrences among the electronic document associated with the particular topic. Additionally or alternatively, the top-ranking topic terms 702 may be the top-ranking in terms of relevance in characterizing the particular topic (e.g., as identified by a user). Additionally or alternatively, the top-ranking topic terms 702 may be the top-ranking in terms of semantic similarity (e.g., the semantic similarity between embedding vectors of the top-ranking topic terms 702 may be the closest of the embedding vectors of the topic terms to the topic centroid of the particular topic and/or to embedding vectors of one or more of the seed texts or theme texts associated with the particular topic).

In some embodiments, the topic representation 700 may include phrase representations 704. The phrase representations 704 may include topic terms and/or topic labels of the particular topic. In some embodiments, the topic representation 700 may include summaries 706. The summaries 706 may include sentences related to the particular topic. For example, the method 600 of FIG. 6 may be an example of a method that may identify sentences that may be related to a topic.

Modifications, additions, or omissions may be made to the topic representation 700 without departing from the scope of the present disclosure. For example, the elements of the topic representation 700 may be arranged in differing order.

Additionally or alternatively, the topic representation 700 may include more or fewer elements than those illustrated and described in the present disclosure. For example, the top-ranking topic terms 702 may include any number of texts. Additionally or alternatively, the phrase representations 704 may include any number of texts, including single words, phrases, bi-grams, tri-grams, and/or n-grams. Additionally or alternatively, the phrase representations 704 may include single words, phrases, bi-grams, tri-grams, and/or n-grams. Additionally or alternatively, the summaries 706 may include any number of sentences.

FIGS. 8A-C illustrate example theme-coverage representations 800 of themes of electronic documents, according to at least one embodiment described in the present disclosure.

FIGS. 8A-8C includes six topics including a first topic 802A "Human-centric," a second topic 802B "Privacy," a third topic 802C "Fairness," a fourth topic 802D "Trustworthy," a fifth topic 802E "Transparency," and a sixth topic 802F "Exaplainable." The six topics may be referred to collectively as topics 802 and/or individually as topic 802. The topics 802 may related to topics identified by the topic inference (e.g., topic inferrer 250 of FIG. 2). Additionally or alternatively, the topics 802 may be related to theme texts provided by the user (e.g., theme texts 104 of FIG. 2).

FIGS. 8A and 8B include five electronic documents including a first electronic document 804A, a second electronic document 804B, a third electronic document 804C, a fourth electronic document 804D, and a fifth electronic document 804E. The five electronic documents may be referred to collectively as electronic documents 804 and/or individually as electronic document 804.

FIG. 8A illustrates one way to visualize theme coverage. The first theme-coverage representation 800A illustrates a correlation between the electronic documents 804 and the topics 802. For example, the first theme-coverage representation 800A may illustrate how related each of the electronic documents 804 are with each of the topics 802 with a number of stars. The relatedness of the electronic documents 804 to the topics 802 may be indicated by occurrences of topic terms associated with each of the topics 802 in each of the electronic documents 804. For example, the fourth electronic document 804D may include many of the topic terms of the third topic 802C and not many topic terms of the second topic 802B.

The first theme-coverage representation 800A may be a practical way to visualize the correlation between topics 802 and a few documents 804 at a time. A topic model may categorize millions of electronic documents (or more). The first theme-coverage representation 800A may be well-suited to viewing the correlation between the topics 802 and a subset of the electronic documents categorized by the model. For example, a user may be able to select a subset of the electronic documents (and/or the topics) to view in the first theme-coverage representation 800A. For example, the user may choose to view all of the top-ranking documents associated with a particular topic.

FIG. 8B illustrates another way to visualize theme coverage. The second theme-coverage representation 800B illustrates a correlation between the electronic documents 804 and the topics 802. In the second theme-coverage representation 800B, the proximity between the electronic documents 804 and the topics 802 may be indicative of a relationship between the electronic documents 804 and the topics 802. For example, the second electronic document 804B being closer to the sixth topic 802F than the fourth electronic document 804D is to the sixth topic 802F may indicate that the second electronic document 804B is more closely related to the sixth topic 802F than the fourth electronic document 804D is to the sixth topic 802F. Additionally or alternatively, the third electronic document 804C being closer to the first topic 802A than the third electronic document 804C is to the fifth topic 802E may indicate that the third electronic document 804C is more closely related to the 802A than the third electronic document 804C is to the fifth topic 802E.

In some embodiments, the second theme-coverage representation 800B may include multiple dimensions representing proximity. For example, the second theme-coverage representation 800B may include a three-dimensional space viewable and rotatable. Additionally or alternatively, colors in the second theme-coverage representation 800B may represent a dimension.

The second theme-coverage representation 800B may be an effective way of viewing correlations between hundreds, thousands, or even millions or more of electronic documents 804 with the topics 802. In some embodiments, the representations of the electronic documents 804 may be reduced in size to accommodate the number of electronic documents 804. Additionally or alternatively, multiple electronic documents 804 may be clustered and represented by small representations. Additionally or alternatively, a subset of the electronic documents and/or the topics may be selected for visualization according to the second theme-coverage representation 800B.

FIG. 8C illustrates another way to visualize theme coverage. The third theme-coverage representation 800C illustrates a correlation between the topics 802 and texts 808. The texts 808 may include single words, phrases, bi-grams, tri-grams and n-grams. The texts 808 may be derived from the electronic documents. Additionally or alternatively, the texts 808 may be topic terms used in a topic model related to the electronic documents. Similar to what was described above with regard to FIG. 8B, proximity between each of the texts 808 and the topics 802 may indicate a relationship between the texts 808 and the topics 802. In some embodiments, colors may be used to represent additional information. For example, topic terms may have the same color as the representation of the topics 802 to which they are associated.

In some embodiments, each of the theme-coverage representations 800 may be used interactively, for example, in a GUI. For example, a user may be able to select an electronic document from the second theme-coverage representation 800B and view the electronic document in the first theme-coverage representation 800A. Additionally or alternatively, a user may be able to select a topic from any of the theme-coverage representations 800 and view a representation similar to the topic representation 700 of FIG. 7 for the topic.

Modifications, additions, or omissions may be made to the theme-coverage representations 800 without departing from the scope of the present disclosure. For example, the elements of the theme-coverage representations 800 may be arranged in differing order. Additionally or alternatively, the theme-coverage representations 800 may include more or fewer elements than those illustrated and described in the present disclosure.

Figure 9:
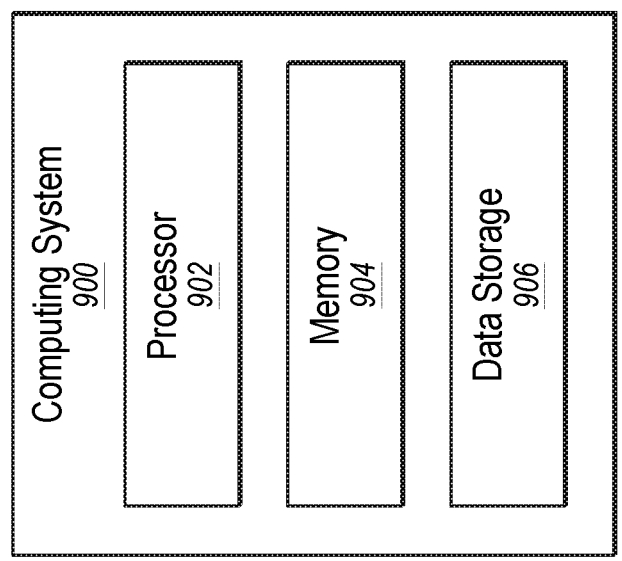
FIG. 9 illustrates a block diagram of an example computing system.

FIG. 9 illustrates a block diagram of an example computing system 900, according to at least one embodiment of the present disclosure. The computing system 900 may be configured to implement or direct one or more operations associated with a analyzing topics of electronic documents using semantic similarity (e.g., environment 100 of FIG. 1) or (e.g., the environment 200 of FIG. 2). The computing system 900 may include a processor 902, a memory 904, and a data storage 906. The processor 902, the memory 904, and the data storage 906 may be communicatively coupled.

In general, the processor 902 may include any suitable special-purpose or general-purpose computer, computing entity, or processing device including various computer hardware or software modules and may be configured to execute instructions stored on any applicable computer-readable storage media. For example, the processor 902 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 9, the processor 902 may include any number of processors configured to, individually or collectively, perform or direct performance of any number of operations described in the present disclosure. Additionally, one or more of the processors may be present on one or more different electronic devices, such as different servers.

In some embodiments, the processor 902 may be configured to interpret and/or execute program instructions and/or process data stored in the memory 904, the data storage 906, or the memory 904 and the data storage 906. In some embodiments, the processor 902 may fetch program instructions from the data storage 906 and load the program instructions in the memory 904. After the program instructions are loaded into memory 904, the processor 902 may execute the program instructions.

For example, in some embodiments, one or more of the above mentioned modules (e.g., the text analyzer 230) may be included in the data storage 906 as program instructions. The processor 902 may fetch the program instructions of a corresponding module from the data storage 906 and may load the program instructions of the corresponding module in the memory 904. After the program instructions of the corresponding module are loaded into memory 904, the processor 902 may execute the program instructions such that the computing system may implement the operations associated with the corresponding module as directed by the instructions.

The memory 904 and the data storage 906 may include computer-readable storage media for carrying or having computer-executable instructions or data structures stored thereon. Such computer-readable storage media may include any available media that may be accessed by a general-purpose or special-purpose computer, such as the processor 902. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 902 to perform a certain operation or group of operations.

Modifications, additions, or omissions may be made to the computing system 900 without departing from the scope of the present disclosure. For example, in some embodiments, the computing system 900 may include any number of other components that may not be explicitly illustrated or described.

Figure 10:
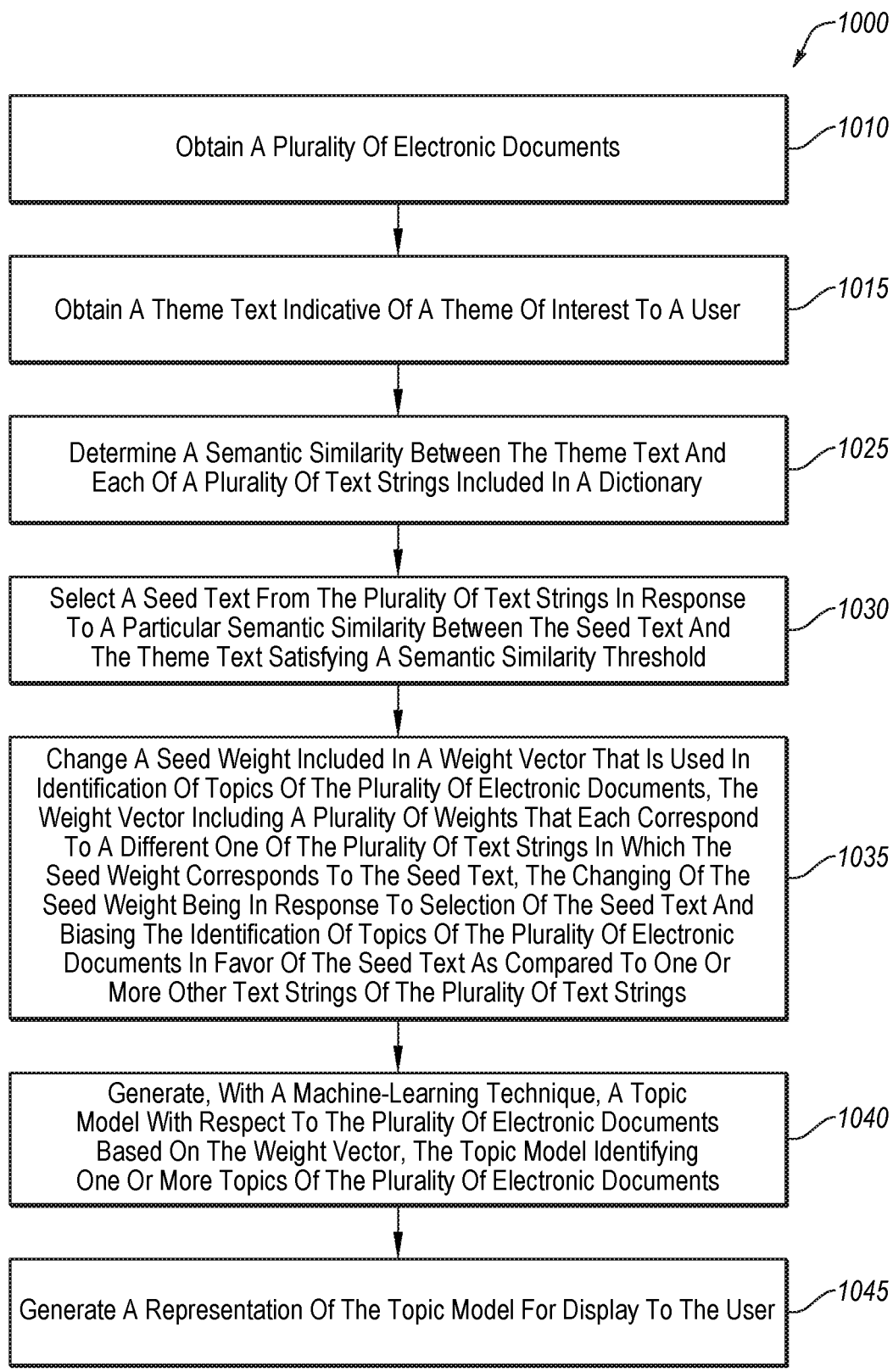
FIG. 10 is a flowchart of an example method of analyzing topics of electronic documents using semantic similarity.

FIG. 10 is a flowchart of an example method 1000 of analyzing topics of electronic documents using semantic similarity, according to at least one embodiment described in the present disclosure. The method 1000 may be performed by any suitable system, apparatus, or device. For example, the environment 100 of FIG. 1, the environment 200 of FIG. 2, or the computing system 900 of FIG. 9 (e.g., as directed by one or more modules) may perform one or more of the operations associated with the method 1000. Although illustrated with discrete blocks, the steps and operations associated with one or more of the blocks of the method 1000 may be divided into additional blocks, combined into fewer blocks, or eliminated, depending on the particular implementation.

The method 1000 may begin at block 1010. At block 1010, multiple electronic documents may be obtained. The electronic documents 102 of FIG. 2 may be examples of the multiple electronic documents obtained at block 1010.

At block 1015, a theme text indicative of a theme of interest to a user may be obtained. One of the theme texts 104 of FIG. 2 may be an example of the theme text of block 1015.

At block 1025, a semantic similarity between the theme text and each of multiple text strings included in a dictionary may be determined. For example, a multiple text strings may be obtained from a dictionary (e.g., the embedding dictionary 110 of FIG. 2). An example of one or more of the operations that may be included in the block 1025 is illustrated above with regard to FIG. 3. A semantic similarity between each of the multiple text strings and the theme text may be determined based on a vector distance (e.g., a cosine distance) between the theme text and each of the multiple text strings.

At block 1030, a seed text from the plurality of text strings may be selected in response to a particular semantic similarity between the seed text and the theme text satisfying a semantic similarity threshold. One of the seed texts 232 of FIG. 2 may be an example of the seed text selected at block 1030. An example of one or more of the operations that may be included in the block 1025 is illustrated above with regard to FIG. 3.

At block 1035, a seed weight included in a weight vector that is used in identification of topics of the plurality of documents may be changed. The weight vector may include a plurality of weights that each correspond to a different one of the plurality of text strings in which the seed weight corresponds to the seed text. The changing of the seed weight may be in response to selection of the seed text. The changing of the seed weight may bias the identification of topics of the plurality of documents in favor of the seed text as compared to one or more other text strings of the plurality of text strings. The weight vectors 242 may be an example of the weight vector changed at block 1035.

At block 1040, a representation of a topic model may be generated for display to a user. In some embodiments, the topic model may, additionally or alternatively, be generated. The topic model may be with respect to the plurality of documents based on the weight vector and may be generated with a machine-learning technique. The topic model may identify one or more topics of the multiple documents obtained at the block 1010. The topic model used in the topic inferrer 250 of FIG. 2 may be an example of the topic model generated at block 1040. The topic-model representation 262 of FIG. 2 may be an example of the representation generated at block 1040. Additionally or alternatively, the representation of the topic model 400 of FIG. 4, the topic representation 700 of FIG. 7, and/or any of the theme-coverage representations 800 of FIGS. 8A-8C may be examples of the representation generated at block 1040. An example of one or more of the operations that may be included in the block 1040 is illustrated above with regard to FIG. 6.

In some embodiments, after the topic model has been generated, the topic model may be refined based on semantic similarities between the topic terms and the seed texts. For example, the topics and/or topic terms may be refined based on a semantic similarity between the topic terms and the seed texts. An example of one or more of the operations that may be included in refining the topic model is illustrated above with regard to FIG. 5. For instance, one or more embedding vectors may be generated based on the seed texts (e.g., a centroid vector of the embedding vectors of the seed texts may be generated). An embedding vector may be generated based on each of one or more of the topic terms of one or more of the topics of the topic model. The embedding vectors based on the topic terms may be compared with the embedding vectors based on the seed texts.

Based on the similarities between the vector embeddings of the topic terms to the embedding vectors of the seed texts, one or more of the topic terms may be changed. For example, a topic term may be removed from a topic. As another example, new topic term may be added to a topic. As another example, a new topic may be added (e.g., based on a topic term removed from another topic). As another example, two or more topic terms may be reordered in their ranked association with a topic.

Based on one or more changes to the topic terms, a new weight vectors may be generated, and/or the weight vector of block 1035 may be updated. The new and/or updated weight vectors may reflect changes to topics and/or topic terms. The new and/or updated weight vector may bias a refined topic model in favor of the topics and/or topic terms reflected after the changes.

The new and/or updated weight vectors may be used in the generation of a refined topic model. This may be the same as or substantially similar to what occurred at block 1040. A refined topic-model representation may be generated. The generation of the refined topic model representation may be the same as or substantially similar to what occurred at block 1040.

Modifications, additions, or omissions may be made to the method 1000 without departing from the scope of the present disclosure. For example, the operations of method 1000 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

As indicated above, the embodiments described in the present disclosure may include the use of a special purpose or general purpose computer (e.g., the processor 902 of FIG. 9) including various computer hardware or software modules, as discussed in greater detail below. Further, as indicated above, embodiments described in the present disclosure may be implemented using computer-readable media (e.g., the memory 904 or data storage 906 of FIG. 9) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B." Additionally, use of the term "and/or" in the present disclosure does not change the interpretation of the term "or" described in the preceding sentences.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
    obtaining a plurality of electronic documents;
    obtaining a theme text indicative of a theme of interest to a user;
    determining a semantic similarity between the theme text and each of a plurality of text strings included in a dictionary;
    selecting a seed text from the plurality of text strings in response to a particular semantic similarity between the seed text and the theme text satisfying a semantic similarity threshold, the particular semantic similarity between the seed text and the theme text being determined using a topic centroid of a topic associated with the theme text and based on a word embedding of the seed text;
    changing a seed weight included in a weight vector that is used in identification of topics of the plurality of electronic documents based on a vector distance between the weight vector and the topic centroid, the weight vector including a plurality of weights that each correspond to a different one of the plurality of text strings in which the seed weight corresponds to the seed text, the changing of the seed weight being in response to selection of the seed text and biasing the identification of topics of the plurality of electronic documents in favor of the seed text as compared to one or more other text strings of the plurality of text strings;
    generating a representation of a topic model for display to the user, the topic model being generated according to a statistical inference technique that makes associations between the plurality of electronic documents and the topics corresponding to the weight vector with bias towards the seed text, the topic model identifying one or more topics of the plurality of electronic documents, the representation including one or more selection elements that each correspond to a respective topic of the one or more topics; and
    in response to selection of a respective selection element of the one or more selection elements, presenting one or more of the plurality of electronic documents that each correspond to the respective topic that corresponds to the respective selection element.

2. The method of claim 1, wherein each of the plurality of text strings includes a word or a phrase.

3. The method of claim 1, wherein determining the semantic similarity is based on a vector distance between a first word embedding of the theme text and each of a plurality of second word embeddings corresponding to a respective one of the plurality of text strings.

4. The method of claim 1, further comprising generating the topic model comprises using a Bayesian inference technique wherein the weight vector is used as a prior knowledge vector in the Bayesian inference technique.

5. The method of claim 1, further comprising:
    displaying to the user the representation of the topic model, wherein the representation of the topic model includes a plurality of topic terms that are each related to a respective topic of one or more of the plurality of electronic documents;
    obtaining an input from the user indicating a change to a topic term of the plurality of topic terms;
    based on the input, identifying refined topic terms reflecting the change to the topic term;
    changing a refining weight included in a refined weight vector that is used in identification of refined topics of the plurality of electronic documents, the changing the refining weight being in response to the identification of the refined topic terms and biasing the identification of the refined topics of the plurality of electronic documents in favor of the refined topic terms; and
    generating, as a refined topic model, a refined representation of the topic model for display to the user, the refined topic model based on the plurality of electronic documents and the refined weight vector, the refined topic model identifying the refined topics of the plurality of electronic documents.

6. The method of claim 1, wherein the topic model includes a topic term, the topic term related to a topic of one or more electronic documents of the plurality of electronic documents, the method further comprising:
    determining a semantic similarity between the topic term and a refined seed text;
    selecting the refined seed text in response to the semantic similarity between the topic term and the refined seed text satisfying a refined semantic similarity threshold;
    changing a refining weight included in a refined weight vector that is used in identification of refined topics of the plurality of electronic documents, the changing the refining weight being in response to the selection of the refined seed text and biasing the identification of the refined topics of the plurality of electronic documents in favor of the refined seed text; and
    wherein the generation of the representation of the topic model comprises refining the topic model to generate a refined topic model, the refined topic model based on the plurality of electronic documents and the refined weight vector, the refined topic model identifying the refined topics of the plurality of electronic documents.

7. The method of claim 1, wherein the topic model includes a plurality of topic terms, the plurality of topic terms related to a particular topic of one or more electronic documents of the plurality of electronic documents, the method further comprising:
    obtaining a topic inconsistency of a particular topic term of the plurality of topic terms based on a semantic similarity between the particular topic term and the seed text;
    based on the topic inconsistency satisfying an inconsistency threshold, identifying a refined plurality of topics terms related to the particular topic, the refined plurality of topic terms excluding the particular topic term;
    based on the refined plurality of topic terms, changing a refining weight included in a refined weight vector that is used in identification of refined topics of the plurality of electronic documents, the changing the refining weight biasing the identification of the refined topics of the plurality of electronic documents in favor of the refined plurality of topic terms; and
    wherein the generation of the representation of the topic model comprises refining the topic model to generate a refined topic model, the refined topic model based on the plurality of electronic documents and the refined weight vector, the refined topic model identifying the refined topics of the plurality of electronic documents.

8. The method of claim 7, further comprising:
in response to the identification of the refined plurality of topic terms excluding the particular topic term, generating a new topic of the electronic documents, the new topic related to the particular topic term;
in response to the generation of the new topic, generating a new refined weight vector that is used in identification of the refined topics of the plurality of electronic documents, the new refined weight vector biasing identification of the refined topics of the plurality of electronic documents in favor of the particular topic term; and
wherein the refined topic model is further based on the new refined weight vector.

9. The method of claim 7, wherein obtaining the topic inconsistency comprises obtaining a vector distance between a word embedding of the particular topic term and the topic centroid.

10. The method of claim 1, wherein the topic model includes a plurality of topic terms, the plurality of topic terms related to a particular topic of one or more electronic documents of the plurality of electronic documents, and wherein the generation of the representation of the topic model further comprises:
identifying a plurality of sentences from the one or more electronic documents, each of the plurality of sentences including one or more of the plurality of topic terms;
obtaining a plurality of sentence embeddings of the plurality of sentences;
obtaining a topic centroid of the topic, the topic centroid based on a plurality of word embeddings of the seed text;
determining a sentence semantic similarity between the topic centroid and each of the plurality of sentence embeddings;
selecting a sentence from the plurality of sentences in response to a particular sentence semantic similarity between the topic centroid and a sentence embedding of the sentence satisfying a sentence semantic similarity threshold; and
including in the representation of the topic model the sentence in response to the selection of the sentence.

11. The method of claim 10, further comprising:
obtaining a second topic centroid of a second topic of one or more other electronic documents of the plurality of electronic documents; and
determining a semantic distinction between the second topic centroid and the sentence embedding of the sentence; and
wherein the selection of the sentence is further in based on the semantic distinction satisfying the sentence semantic similarity threshold.

12. The method of claim 1, wherein the representation of the topic model includes a representation of how many electronic documents of the plurality of electronic documents relate to the theme of interest.

13. The method of claim 12, the method further comprising obtaining a plurality of theme texts indicative of a plurality of themes of interest to the user wherein the representation of the topic model includes a representation of how many electronic documents of the plurality of electronic documents relate to each of the plurality of themes.

14. The method of claim 12, wherein the representation of the topic model includes a visual representation of a proportion of the plurality of electronic documents that relate to the theme of interest.

15. At least one non-transitory computer-readable media configured to store one or more instructions that when executed by at least one processor cause or direct a system to perform operations, the operations comprising:
obtaining a plurality of electronic documents;
obtaining theme text indicative of a theme of interest to a user;
determining a semantic similarity between the theme text and each of a plurality of text strings included in a weight vector that is used in identification of topics of the plurality of electronic documents, the weight vector including a plurality of weights that each correspond to a different one of the plurality of text strings;
selecting a seed text from the plurality of text strings in response to a particular semantic similarity between the seed text and the theme text satisfying a semantic similarity threshold, the particular semantic similarity between the seed text and the theme text being determined using a topic centroid of a topic associated with the theme text and based on a word embedding of the seed text;
changing a seed weight included in a weight vector that is used in identification of topics of the plurality of electronic documents based on a vector distance between the weight vector and the topic centroid, the weight vector including a plurality of weights that each correspond to a different one of the plurality of text strings in which the seed weight corresponds to the seed text, the changing of the seed weight being in response to selection of the seed text and biasing the identification of topics of the plurality of electronic documents in favor of the seed text as compared to one or more other text strings of the plurality of text strings;
generating a representation of a topic model for display to the user, the topic model being generated according to a statistical inference technique that makes associations between the plurality of electronic documents and the topics corresponding to the weight vector with bias towards the seed text, the topic model identifying one or more topics of the plurality of electronic documents, the representation including one or more selection elements that each correspond to a respective topic of the one or more topics; and
in response to selection of a respective selection element of the one or more selection elements, presenting one or more of the plurality of electronic documents that each correspond to the respective topic that corresponds to the respective selection element.

16. The at least one non-transitory computer-readable media of claim 15, wherein the operations further comprise:
displaying to the user the representation of the topic model, wherein the representation of the topic model includes a plurality of topic terms that are each related to a respective topic of one or more of the plurality of electronic documents;
obtaining an input from the user indicating a change to a topic term of the plurality of topic terms;
based on the input, identifying refined topic terms reflecting the change to the topic term;
changing a refining weight included in a refined weight vector that is used in identification of refined topics of the plurality of electronic documents, the changing the refining weight being in response to the identification of the refined topic terms and biasing the identification of the refined topics of the plurality of electronic documents in favor of the refined topic terms;

generating, as a refined topic model, a refined representation of the topic model for display to the user, the refined topic model based on the plurality of electronic documents and the refined weight vector, the refined topic model identifying the refined topics of the plurality of electronic documents.

17. The at least one non-transitory computer-readable media of claim 15, wherein the topic model includes a topic term, the topic term related to a topic of one or more electronic documents of the plurality of electronic documents and wherein the operations further comprise:

determining a semantic similarity between the topic term and a refined seed text;

selecting the refined seed text in response to the semantic similarity between the topic term and the refined seed text satisfying a refined semantic similarity threshold;

changing a refining weight included in a refined weight vector that is used in identification of refined topics of the plurality of electronic documents, the changing the refining weight being in response to the selection of the refined seed text and biasing the identification of the refined topics of the plurality of electronic documents in favor of the refined seed text; and generating, with a machine-learning technique, a refined topic model with respect to the plurality of electronic documents based on the refined weight vector, the refined topic model identifying the refined topics of the plurality of electronic documents; and wherein the generation of the representation comprises the generating of the refined topic model.

18. A system including one or more processors and one or more computer-readable media, the system configured to perform operations comprising:

obtaining a plurality of electronic documents;

obtaining theme text indicative of a theme of interest to a user;

determining a semantic similarity between the theme text and each of a plurality of text strings;

selecting a seed text from the plurality of text strings in response to a particular semantic similarity between the seed text and the theme text satisfying a semantic similarity threshold, the particular semantic similarity between the seed text and the theme text being determined using a topic centroid of a topic associated with the theme text and based on a word embedding of the seed text;

changing a seed weight included in a weight vector that is used in identification of topics of the plurality of electronic documents based on a vector distance between the weight vector and the topic centroid, the weight vector including a plurality of weights that each correspond to a different one of the plurality of text strings in which the seed weight corresponds to the seed text, the changing of the seed weight being in response to selection of the seed text and biasing the identification of topics of the plurality of electronic documents in favor of the seed text as compared to one or more other text strings of the plurality of text strings;

generating a representation of a topic model for display to the user, the topic model being generated according to a statistical inference technique that makes associations between the plurality of electronic documents and the topics corresponding to the weight vector with bias towards the seed text, the topic model identifying one or more topics of the plurality of electronic documents, the representation including one or more selection elements that each correspond to a respective topic of the one or more topics; and in response to selection of a respective selection element of the one or more selection elements, presenting one or more of the plurality of electronic documents that each correspond to the respective topic that corresponds to the respective selection element.

19. The system of claim 18, wherein the operations further comprise:

displaying to the user the representation of the topic model, wherein the representation of the topic model includes a plurality of topic terms that are each related to a respective topic of one or more of the plurality of electronic documents;

obtaining an input from the user indicating a change to a topic term of the plurality of topic terms;

based on the input, identifying refined topic terms reflecting the change to the topic term;

changing a refining weight included in a refined weight vector that is used in identification of refined topics of the plurality of electronic documents, the changing the refining weight being in response to the identification of the refined topic terms and biasing the identification of the refined topics of the plurality of electronic documents in favor of the refined topic terms;

generating, as a refined topic model, a refined representation of the topic model for display to the user, the refined topic model based on the plurality of electronic documents and the refined weight vector, the refined topic model identifying the refined topics of the plurality of electronic documents.

20. The system of claim 18, wherein the topic model includes a topic term, the topic term related to a topic of one or more electronic documents of the plurality of electronic documents and wherein the operations further comprise:

determining a semantic similarity between the topic term and a refined seed text;

selecting the refined seed text in response to the semantic similarity between the topic term and the refined seed text satisfying a refined semantic similarity threshold;

changing a refining weight included in a refined weight vector that is used in identification of refined topics of the plurality of electronic documents, the changing the refining weight being in response to the selection of the refined seed text and biasing the identification of the refined topics of the plurality of electronic documents in favor of the refined seed text; and generating, with a machine-learning technique, a refined topic model with respect to the plurality of electronic documents based on the refined weight vector, the refined topic model identifying the refined topics of the plurality of electronic documents; and wherein the generation of the representation comprises the generating of the refined topic model.

* * * * *